(12) United States Patent
Saito et al.

(10) Patent No.: US 6,676,401 B2
(45) Date of Patent: Jan. 13, 2004

(54) IN-MOLD GATE OPENING AND CLOSING MECHANISM AND METAL MOLD FOR INJECTION MOLDING

(75) Inventors: Toshio Saito, Tokyo (JP); Makoto Ohno, Nagoya (JP)

(73) Assignee: Fisa Corporation, Tokyo (JP)

( * ) Notice: Subject to any disclaimer, the term of this patent is extended or adjusted under 35 U.S.C. 154(b) by 0 days.

(21) Appl. No.: 10/023,991

(22) Filed: Dec. 21, 2001

(65) Prior Publication Data

US 2002/0081349 A1 Jun. 27, 2002

(30) Foreign Application Priority Data

| Dec. 22, 2000 | (JP) | ................................. P2000-390386 |
| Mar. 12, 2001 | (JP) | ................................. P2001-68265 |
| May 31, 2001 | (JP) | ................................. P2001-163903 |
| Jun. 12, 2001 | (JP) | ................................. P2001-176459 |
| Nov. 12, 2001 | (JP) | ................................. P2001-345762 |

(51) Int. Cl.[7] ............................................. B29C 45/23
(52) U.S. Cl. ..................... 425/563; 264/328.9; 425/566
(58) Field of Search ................................. 425/562, 563, 425/564, 565, 566, 572, 588; 264/328.7, 328.9

(56) References Cited

U.S. PATENT DOCUMENTS 3,491,408 A * 1/1970 Natkins ....................... 425/563

FOREIGN PATENT DOCUMENTS

| JP | 61143108 | 6/1986 |
| JP | 05116181 | 5/1993 |
| JP | 0936048 | 8/1999 |
| JP | 11254487 | 9/1999 |

OTHER PUBLICATIONS

Patent Abstracts of Japan, vol. 017, No. 479 (M–1471), Aug. 31, 1993, on JP 05 116181.
Patent Abstracts of Japan, vol. 010, No. 342 (M–536), Nov. 19, 1986, on JP 61 143108.
Patent Abstracts of Japan, vol. 1999, No. 14, Dec. 22, 1999, on JP 11 254487.

* cited by examiner

Primary Examiner—Tim Heitbrink
(74) Attorney, Agent, or Firm—Roylance, Abrams, Berdo & Goodman, LLP

(57) ABSTRACT

The present invention relates to an in-mold gate opening and closing mechanism in which it is easy to adjust the gate balance, more specially, in an in-mold gate opening and closing mechanism, in which a gate pin disposed in a gate in a mold is moved in line with resin pressure in the gate, the gate is opened by the gate pin escaping from the gate when the resin pressure exceeds an appointed pressure level when filling resin, and the gate is closed by the gate pin moving the gate direction when the resin pressure is lowered from the appointed pressure level when a filling of the resin is completed, wherein the gate is opened by a gate pin escaping from the gate when the resin pressure exceeds a pressing force of a spring adjusted by a mechanism for adjusting the spring pressure when filling resin.

14 Claims, 29 Drawing Sheets

A

B

A

B

A

B

IN-MOLD GATE OPENING AND CLOSING MECHANISM AND METAL MOLD FOR INJECTION MOLDING

BACKGROUND OF THE INVENTION

1. Field of the Invention

The present invention relates to an in-mold gate opening and closing mechanism and a metal mold for injection molding.

2. Description of the Prior Art

Briefly speaking, a method for injection molding of synthetic resin is carried out by a cycle of picking up a solidified molded article from a metal mold by opening the metal mold (mold opening) after tightening an upper mold (fixed die or female die) and a lower mold (movable die or male die), filling the metal mold with melted synthetic resin, and cooling the same. At this time, since the molded article is provided with a resin part, a so-called "spool runner gate", it is necessary to cut off the resin part by a certain method.

As a classical method, the gate portion (resin part) is cut off by cutting pliers, etc., various types of in-mold gate opening and closing mechanisms have been proposed and carried out as technical objects of improvement in production efficiency, a lowering of production costs, improvement in aesthetic evaluation, etc.

As an in-mold gate opening and closing mechanism, a system in which a gate opening and closing pin incorporated in advance in a mold is moved in line with opening movement of the mold, and is operated to the gate portion by an exclusively attached fluid pressure means, and the gate portion is cut off, a system in which the gate opening and closing pin is actuated by movement of a movable mold when opening the mold, and a tunnel gate system have been publicly known.

Since a conventionally known in-mold gate opening and closing mechanism is constructed so that a gate opening and closing pin is actuated in line with movement of an exclusively attached fluid pressure means and a movable mold, the mechanism is large-sized and complicated. Also, in the former system, a process to open and close a gate when opening the mold is required, and a loss in time is produced to carry out the process (cf. Japanese Patent No. 2966707).

In a case of multi-gate molding or molding to produce a plurality of articles, the number of gates is increased, and positioning of the gates becomes cumbersome. Therefore, in an in-mold gate opening and closing mechanism of the conventional system, there is a difficulty or a problem in that design and production of metal molds become complicated and increase costs.

Further, in the in-mold gate opening and closing mechanism of the conventional system, there is another shortcoming in that an aesthetic cut surface cannot be obtained because the gate portions are cut off after resin is hardened.

SUMMARY OF THE INVENTION

In view of the above-described problems and shortcomings, it is therefore an object of the invention to provide an in-mold gate opening and closing mechanism, whose structure is compact and simple, capable of facilitating incorporation of a cold runner die, a hot runner die, etc., into a mold and adjustment of gate balance, and a metal mold for injection molding.

The in-mold gate opening and closing mechanism and metal mold for injection molding according to the present invention is featured in the following construction:

1. (Refer to FIGS. 1~10 and 15~29) An in-mold gate opening and closing mechanism constructed so that a gate pin disposed at a gate in a mold is moved on the basis of resin pressure in the gate, in which the gate is opened by the gate pin escaping from the gate when the resin pressure exceeds an appointed pressure level when filling resin, and the gate is closed by the gate pin moving the gate direction when the resin pressure is lowered from the appointed pressure level when a filling of the resin is completed, wherein a void for a gate is provided at the upper end part of a base body, a guide groove is provided continuously from the gate void, and a gate pin is disposed therein; the corresponding gate pin is pressed in the direction of the above-described gate void by a spring disposed in the above-described base body, and a mechanism for adjusting spring pressure of the corresponding spring is provided; the corresponding gate pin escapes from the gate when the resin pressure exceeds a pressing force of the spring, which is adjusted by a mechanism for adjusting the spring pressure when filling resin to open the gate; and the above-described gate pin is moved in the gate direction by a pressing force of the spring adjusted by the mechanism for adjusting the above-described spring pressure when the resin pressure is lowered below an appointed pressure level after a filling of the resin is completed.

2. (Refer to FIG. 1) An in-mold gate opening and closing mechanism, in which one unit having the following component elements (A), (B) and (C) incorporated on the surface and in an inner space of the base body consisting of a metallic block is formed and incorporated in a metal mold, and a runner gate is opened and closed from the direction orthogonal to or the same direction as the direction of the gate.

(A) A gate void is formed at the upper end portion of a base body, and a gate pin is disposed in a guide groove provided continuously from the gate void.

(B) A columnar space is provided at the lower part of the above-described gate void inside the above-described base body, a spring and a moving cylinder in which the spring is accommodated are inserted into the columnar space, and the lower end of the above-described gate pin is engaged with and fixed at the rear end of the moving cylinder, wherein the above-described gate pin is always pressed in the direction of the gate void by a force of the above-described spring.

(C) A spring pressure adjusting nut that presses the rear end of the above-described spring is provided in a screwed-in state so as to turn clockwise and counterclockwise at the open end side of the above-described moving cylinder of the base body, wherein a pressing force acting on the gate pin can be increased by turning the corresponding spring pressure adjusting nut in the direction of contraction of the spring, and the pressing force acting on the gate pin can be decreased by turning the adjusting nut in the reverse direction of the corresponding turning direction.

3. (Refer to FIGS. 2 and 3) An in-mold gate opening and closing mechanism, in which one unit having the following component elements (A), (B) and (C) incorporated on the surface and in an inner space of the base body consisting of a metallic block is formed and incorporated in a metal mold, and a runner gate is opened and closed from the direction orthogonal to or the same direction as the direction of the gate.

(A) A gate void is formed at the upper end portion of a base body, and a gate pin is disposed in a guide groove provided continuously from the gate void.

(B) A columnar space is provided at the lower part of the above-described gate void inside the above-described base body, and a moving cylinder is inserted into the corresponding columnar space, a center shaft, which is inserted into the spring, is accommodated in the corresponding moving cylinder, and the lower end of the above-described gate pin is engaged with and fixed at the rear end of the moving cylinder, wherein the above-described gate pin is always pressed in the direction of the gate void by a force of the above-described spring.

(C) A center shaft is provided between a bearing hole prepared at the tip end side of the above-described base body and a bearing member that presses the rear end of the above-described spring that is fixed in a columnar hole at the rear end side of the base body, the above-described moving cylinder and spring are disposed at the corresponding center shaft, a stop bushing and a worm wheel are further disposed thereat, and the corresponding worm wheel is engaged with a rotatable worm, wherein as the corresponding worm is rotated, the above-described worm wheel that is interlocked with the corresponding worm is rotated, the pressing force of the spring is adjusted by the center shaft moving in the direction of tightening the spring by clockwise rotation on the basis of engagement with a bearing member by a screw mechanism or moving in the direction of opening the spring by counterclockwise rotation.

4. (Refer to FIGS. 5 through 7) An in-mold gate opening and closing mechanism in which a flange portion having an upper surface portion, which is flush with the upper surface portion of the corresponding metal mold when being incorporated in the above-described metal mold, is provided on the upper part of a base body consisting of a metallic block, one unit having the following component elements (A), (B), (C) and (D) incorporated therein is formed on the upper part surface of the base body and in the inner space at the lower part thereof and is incorporated in the metal mold, and a runner gate is opened and closed in the direction orthogonal to the gate direction or in the same direction as the gate direction.

(A) A gate void is formed at the end portion on the upper surface of the base body, and a gate pin is disposed in a guide groove that is provided continuously from the gate void.

(B) A columnar space is provided at the lower part of the above-described gate void inside the above-described base body, and a moving cylinder is inserted into the corresponding columnar space, a center shaft, which is inserted into the spring, is accommodated in the corresponding moving cylinder, and the lower end of the above-described gate pin is engaged with and fixed at the rear end of the moving cylinder, wherein the above-described gate pin is always pressed in the direction of the gate void by a force of the above-described spring.

(C) The above-described center shaft is provided with a gear, in which the corresponding center shaft is made into a rotation axis thereof, at an upper part thereof, a spring receiver nut that presses the rear end of the above-described spring is provided in a screwed-in state so as not to rotate at a portion where the corresponding center shaft is positioned downward toward the columnar space, and the lower end thereof is pivotally supported in a bearing hole at the bottom of the base body.

(D) A spring pressure adjusting nut is provided at the upper surface side of the above-described base body so that the nut can turn clockwise and counterclockwise, a gear that is provided at the lower part of the corresponding spring pressure adjusting nut rotates along with a rotation operation of the corresponding spring pressure adjusting nut, the center shaft rotates by rotation of the gear in which the above-described center shaft engaged with the corresponding gear is made into an axis, and a spring receiving nut that is provided so as not to rotate in accordance with rotation of the corresponding center shaft is moved in the axial direction of the center shaft, wherein the pressing force of the spring is adjusted.

5. (Refer to FIGS. 8 through 10) An in-mold gate opening and closing mechanism in which a flange portion having an upper surface portion, which is flush with the upper surface portion of the corresponding metal mold when being incorporated in the above-described metal mold, is provided on the upper part of a base body consisting of a metallic block, one unit having the following component elements (A), (B), (C) and (D) incorporated therein is formed on the upper part surface of the base body and in the inner space at the lower part thereof and is incorporated in the metal mold, and a runner gate is opened and closed in the direction orthogonal to the gate direction or in the same direction as the gate direction.

(A) A gate void is formed at the end portion on the upper surface of the base body, and a gate pin is disposed in a guide groove that is provided continuously from the gate void.

(B) A columnar space is provided at the lower part of the above-described gate void inside the above-described base body, and a moving cylinder is inserted into the corresponding columnar space, a center shaft, which is inserted into the spring, is accommodated in the corresponding moving cylinder, and the lower end of the above-described gate pin is engaged with and fixed at the rear end of the moving cylinder, wherein the above-described gate pin is always pressed in the direction of the gate void by a force of the above-described spring.

(C) A spring receiving nut that presses the rear end of the above-described spring is provided at the portion where the center shaft is positioned downward toward the columnar space, and the lower end of the center shaft is pivotally supported in a bearing hole at the bottom portion of the base body.

(D) The center shaft is rotated at the bearing shaft that is a hole drilled at the lower part of the above-described base body, and the above-described spring receiving nut is provided so as to move, wherein the pressing force of the spring is adjusted.

6. (Refer to FIGS. 15 through 18) An in-mold gate opening and closing mechanism in which one unit having the following component elements (A), (B), (C), (D) and (E) incorporated therein is formed on the upper surface of a base body consisting of a metallic block and in the inner space at the lower part thereof, and is incorporated in a metal mold, wherein a runner gate is opened and closed in the direction orthogonal to the gate direction or in the same direction as the gate direction.

(A) A gate void is formed at the end portion on the upper surface of the base body, and a gate pin is disposed in a guide groove that is provided continuously from the gate void.

(B) A columnar space is provided at the lower part of the above-described gate void inside the above-described base body, and a moving cylinder is inserted into the corresponding columnar space, a center shaft, which is inserted into the spring, is accommodated in the corresponding moving cylinder, and the lower end of the above-described gate pin is engaged with and fixed at the rear end of the moving cylinder, wherein the above-described gate pin is always pressed in the direction of the gate void by a force of the above-described spring.

(C) The above-described center shaft is provided with a gear, in which the corresponding center shaft is made into a rotation axis, at the upper part thereof, and the downward tip end thereof is inserted into the through-hole portion of an adjusting member, which presses the rear end of the above-described spring, slidably in the axial direction.

(D) The above-described adjusting member is attached to the lower part of the base body in a screwed-in state, and a stopper portion that adjusts the amount of movement with respect to an escape action of the gate pin by limiting the maximum moving position by being brought into contact with the lower end of the moving cylinder is provided at the outer circumference of the corresponding adjusting member.

(E) A spring pressure adjusting nut is provided on the upper surface side of the above-described base body so that the spring pressure adjusting nut can rotate clockwise and counterclockwise, a gear that is provided at the lower part of the corresponding spring pressure adjusting nut rotates along with rotation operations of the corresponding spring pressure adjusting nut, the center shaft rotates by rotation of the gear in which the above-described center shaft engaged with the corresponding gear is made into an axis, the above-described adjusting member moves in the axial direction by rotations together with the center shaft by rotations of the corresponding shaft, wherein the pressing force of the spring is adjusted.

7. An in-mold gate opening and closing mechanism in which one unit having the following component elements (A), (B), (C) and (D) incorporated therein is formed on the surface of the upper part of a base body consisting of a metallic block and in the inner space at the lower part thereof, and is incorporated in a metallic mold, and a runner gate is opened and closed in the direction orthogonal to the gate direction and in the same direction as the gate direction.

(A) A gate void is formed at the end portion on the upper surface of the base body, and a gate pin is disposed in a guide groove that is provided continuously from the gate void.

(B) A columnar space is provided at the lower part of the above-described gate void inside the above-described base body, and a moving cylinder is inserted into the corresponding columnar space, a center shaft, which is inserted into the spring, is accommodated in the corresponding moving cylinder, and the lower end of the above-described gate pin is engaged with and fixed at the rear end of the moving cylinder, wherein the above-described gate pin is always pressed in the direction of the gate void by a force of the above-described spring.

(C) The tip end portion downward of the center shaft is inserted into the through-hole portion of an adjusting member, which presses the rear end of the above-described spring, slidably in the axial direction, and simultaneously, the adjusting member is attached to the lower part of the base body in a screwed-in state, and a stopper portion that adjusts the amount of movement with respect to an escape action of the gate pin by limiting the maximum moving position by being brought into contact with the lower end of the moving cylinder is provided at the outer circumference of the corresponding adjusting member.

(D) The center shaft is rotated at the bearing hole that is a hole drilled at the lower part of the above-described base body, and the above-described adjusting member is moved in the axial direction to adjust the pressing force of the spring.

8. (Refer to FIGS. 19 through 23) An in-mold gate opening and closing mechanism in which one unit having the following component elements (A), (B), (C) and (D) incorporated therein is formed on the surface of the upper part of a base body consisting of a metallic block and in the inner space at the lower part thereof, and is incorporated in a metallic mold, and a runner gate is opened and closed in the direction orthogonal to the gate direction and in the same direction as the gate direction.

(A) A gate void is formed at the end portion on the upper surface of the base body, and a gate pin is disposed in a guide groove that is provided continuously from the gate void.

(B) A columnar space is provided at the lower part of the above-described gate void inside the above-described base body, and a center shaft that is inserted into the spring is accommodated in the corresponding columnar space, the lower end of the above-described gate pin is engaged with and fixed at the upper part of the center shaft, and the above-described gate pin is always pressed in the direction of the gate void by a force of the above-described spring.

(C) An adjusting member that presses the rear end of the above-described spring is fitted to the lower part of the center shaft, and at the same time, to the downward inner side at the lower part of the base body in a screwed-in state, the adjusting member is rotated from the bottom part of the above-described base body, and the adjusting member moves in the axial direction of the center shaft while rotating, wherein the pressing force of the spring is adjusted.

(D) A stopper plane that adjusts the amount of movement with respect to an escape action of the gate pin by limiting the maximum moving position by being brought into contact with the lower end of the center shaft is provided inside the corresponding adjusting member.

9. (Refer to FIGS. 24 through 27) An in-mold gate opening and closing mechanism, in which the lower part of a base body consisting of a metallic block is movably provided in the direction of rotation with respect to the upper part of the base body consisting of a metallic block, one unit having the following component elements (A), (B), (C) and (D) incorporated on the upper surface of the base body and in the inner space at the lower part thereof and is incorporated in the metallic mold, wherein a runner gate is opened and closed in the direction orthogonal to the gate direction or in the same direction as the gate direction.

(A) A gate void is formed at the end portion on the upper surface of the base body, and a gate pin is disposed in a guide groove that is provided continuously from the gate void.

(B) A columnar space is provided at the lower part of the above-described gate void inside the above-described base body, and a center shaft that is inserted into the spring is accommodated in the corresponding columnar space, the lower end of the above-described gate pin is engaged with and fixed at the upper part of the center shaft, and the above-described gate pin is always pressed in the direction of the gate void by a force of the above-described spring.

(C) An adjusting member that presses the rear end of the above-described spring is fitted to the lower part of the center shaft, and at the same time, to the downward inner side at the lower part of the base body in a screwed-in state, the adjusting member is rotated from the bottom part of the above-described base body, and the adjusting member moves in only the axial direction without rotating, wherein the pressing force of the spring is adjusted.

(D) A stopper plane that adjusts the amount of movement with respect to an escape action of the gate pin by limiting the maximum moving position by being brought into contact with the lower end of the center shaft is provided at the inner side portion of the corresponding adjusting member.

10. (Refer to FIGS. 28 and 29) An in-mold gate opening and closing mechanism in which the lower part of a base body consisting of a metallic block is provided so as to be movable in the direction of rotation with respect to the upper part of the base body consisting of a metallic block, one unit having the following component elements (A), (B), (C), (D) and (E) incorporated on the surface of the upper part of the base body and in the inner space at the lower part thereof, and is incorporated in a mold, wherein a runner gate is opened and closed in the direction orthogonal to the gate direction or in the same direction as the gate direction.

(A) A gate void is formed at the end portion on the upper surface of the base body, and a gate pin is disposed in a guide groove that is provided continuously from the gate void.

(B) A columnar space is provided at the lower part of the above-described gate void inside the above-described base body, and a center shaft that is inserted into the spring is accommodated in the corresponding columnar space, the lower end of the above-described gate pin is engaged with and fixed at the upper part of the center shaft, and the above-described gate pin is always pressed in the direction of the gate void by a force of the above-described spring.

(C) The upper end portion at the lower part of the above-described base body is formed to be like a gear, a gear mechanism that is engaged with the corresponding gear-like upper end portion is provided in the upper part of the above-described base body, and an adjusting nut of said gear mechanism is provided on the upper surface at the upper part of the base body.

(D) An adjusting member is fitted downward of the center shaft, and at the same time, to the downward inner side at the lower part of the base body in a screwed-in state, the lower part of the base body is rotated by rotation operations of the adjusting nut, and the adjusting member moves in only the axial direction without rotating, wherein the pressing force of the spring is adjusted.

(E) A stopper plane that adjusts the amount of movement with respect to an escape action of the gate pin by limiting the maximum moving position by being brought into contact with the lower end of the center shaft is provided at the inner side portion of the corresponding adjusting member.

11. (Refer to FIG. 20) The in-mold gate opening and closing apparatus as set forth in any one of the above-described points 6 through 10, wherein the lower part of the base body is cylindrical.

12. (Refer to FIGS. 5 through 29) An in-mold gate opening and closing apparatus as set forth in the above-described points 1 through 11, wherein a flange portion having an upper surface portion that is flush with the upper surface portion of a mold at a portion that incorporates the corresponding in-mold gate opening and closing apparatus is provided on the upper part of the above-described base body.

13. (Refer to FIGS. 16 through 18, 21 through 23 and 25 through 27) An in-mold gate opening and closing apparatus as set forth in any one of the above-described points 1 through 12, wherein the amount of movement of an escape action of the above-described gate pin is adjusted step-free from full opening to full closing of the gate.

14. (Refer to Drawings A and C of FIG. 30) An in-mold gate opening and closing apparatus as set forth in the above-described points 1 through 13, wherein the tip end shape of the above-described gate pin is formed of at least two planes, one of which is a horizontal plane roughly orthogonal to the moving direction of the corresponding gate pin and the other of which is a pressure receiving plane consisting of an inclined plane obliquely crossing the moving direction thereof.

15. (Refer Drawings B and C of FIG. 30) An in-mold gate opening and closing apparatus as set forth in the above-described points 1 through 13, wherein the tip end shape of the above-described gate pin is formed of only a pressure receiving plane consisting of an inclined plane obliquely crossing the moving direction of the corresponding gate pin.

16. (Refer to Drawings C and D of FIG. 30) An in-mold gate opening and closing apparatus as set forth in the above point 14 or 15, wherein the pressure receiving plane consisting of an inclined plane at the tip end of the above-described gate pin is formed to be concavely curved.

17. (Refer to FIG. 4 and FIGS. 11 through 14) A mold for injection molding, which is provided with an in-mold gate opening and closing apparatus as set forth in any one of the above-described points 1 through 16.

18. (Refer to FIG. 31) A mold for injection molding as set forth in the above-described point 17, wherein the end portion at the tip end of the gate pin of the in-mold gate opening and closing apparatus is disposed so that the end portion is not caught by the PL plane when the gate is closed.

DETAILED DESCRIPTION OF PREFERRED EMBODIMENTS

Hereinafter, a description is given of the present invention.

Figure 1:
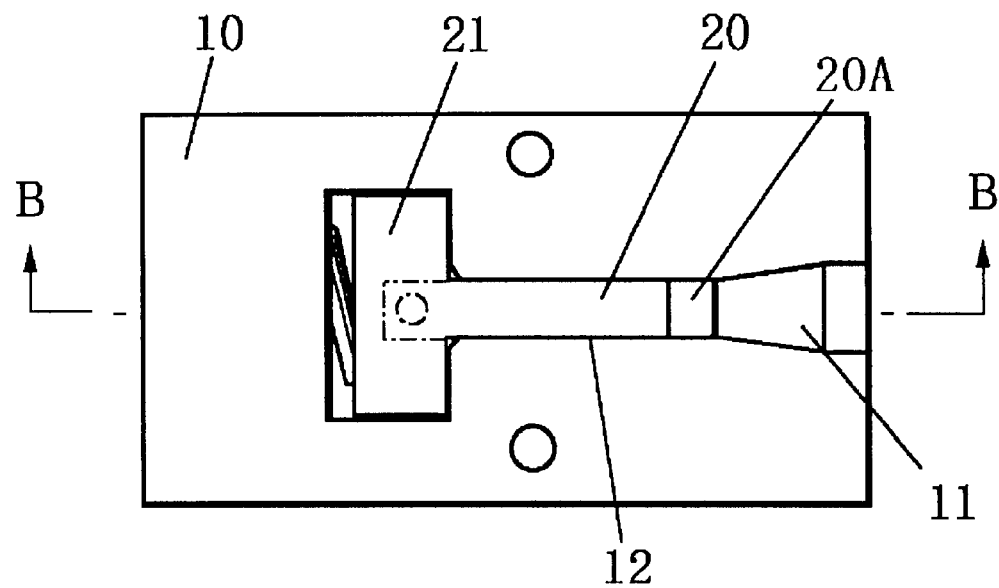
FIG. 1 shows a plan view and a longitudinal-sectional view of a first embodiment of an in-mold gate opening and closing mechanism according to the present invention.
Figure 1:
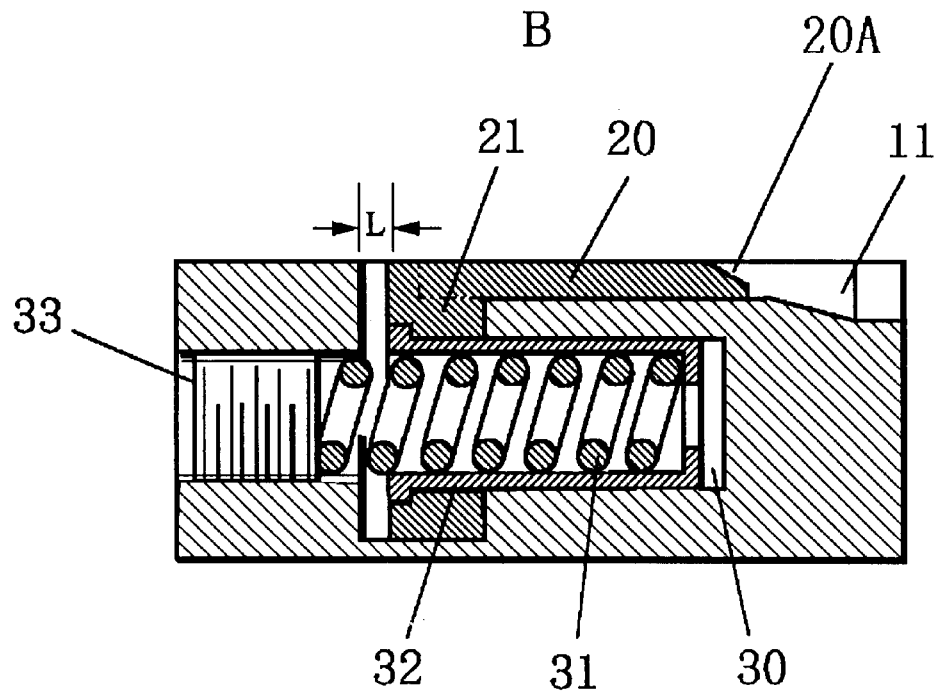

First, the first embodiment of an in-mold gate opening and closing mechanism according to the present invention is explained on the basis of FIG. 1. A base body 10 is a metallic block, and one unit having various components, each of which will be described later, incorporated therein is formed on the surface of the base body 10 and in an inner space thereof. As described later, and is set at a liner (nesting) and is built in a mold (lower die).

As shown in Drawing A of FIG. 1, a gate void 11 is formed at the end portion of the upper surface of the base body 10, and a gate pin 20 is disposed in a guide groove 12 that is provided continuously from the gate void 11. Also, dimensions of the guide groove 12 with respect to the depth and width thereof correspond to the dimensions of the gate pin 20 regarding its thickness and width, wherein the dimensions are kept so accurate that the melted resin does not leak out of the fitting planes of both of the guide groove 12 and the gate pin 20.

As shown by hypothetical lines, the gate pin 20 and base end members 21 thereof are made of separate materials and maybe composed to be integrated together with screws.

Figure 30:
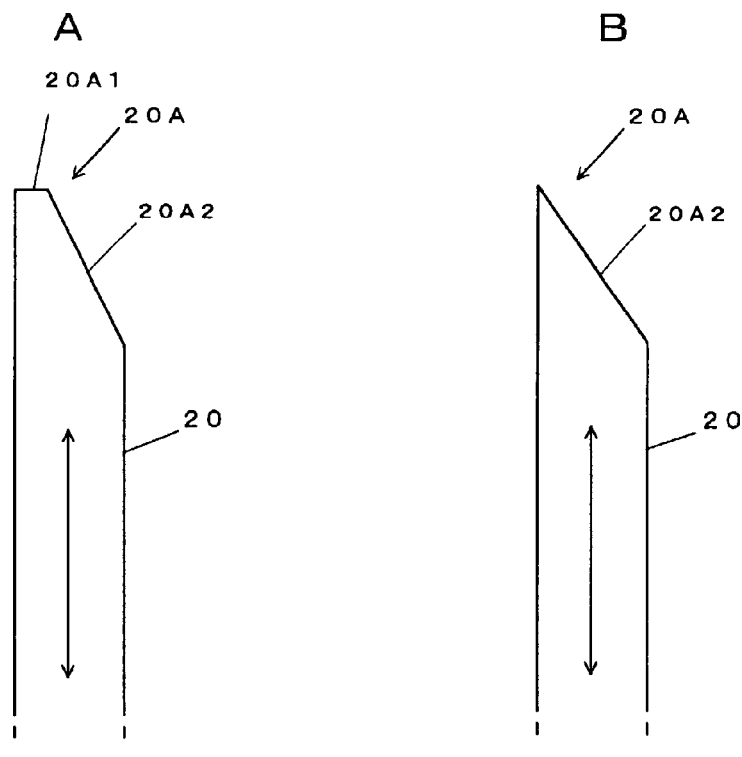
FIG. 30 is a side elevational view of the major parts, showing the tip end shape of a gate pine.
Figure 30:
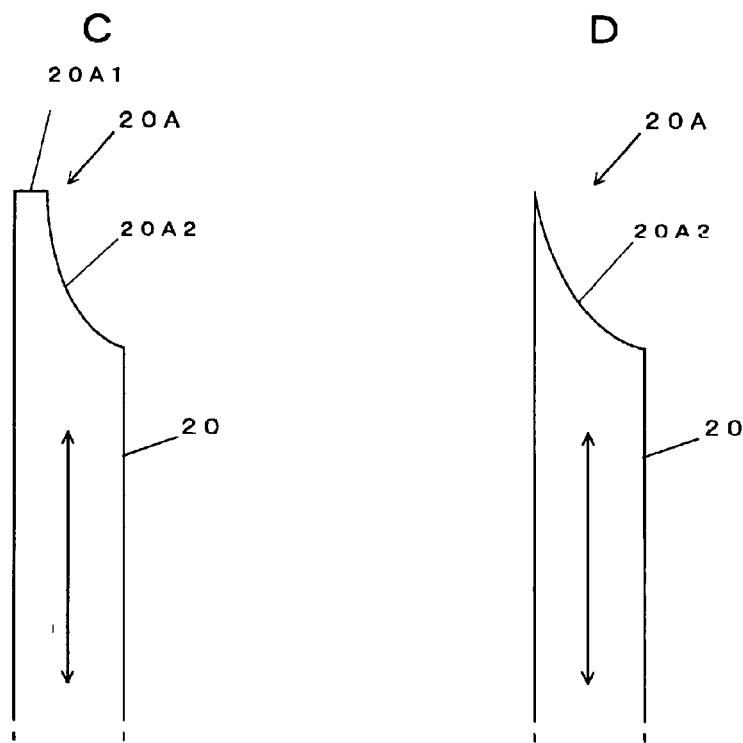

The shape of the tip end 20A (resin pressure receiving plane) of the gate pin 20 may be an inclined plane type as shown in the drawing, wherein the shape is formed of at least two planes, one of which is a horizontal plane 20A1 roughly orthogonal to the moving direction of the gate pin 20 and the other of which is a pressure receiving plane 20A2 consisting of an inclined plane obliquely crossing the moving direction (Refer to Drawing A of FIG. 30), and other shapes may be considered. For example, the shape maybe formed of only a pressure receiving plane 20A2 consisting of an inclined plane by removing the horizontal plane (Refer to Drawing B in FIG. 30), or may be formed of a concavely curved plane of the pressure receiving plane 20A2 consisting of an inclined plane (Refer to Drawings C and D of FIG. 30) If the pressure receiving plane 20A2 consisting of an inclined plane is formed to be concavely curved, it is possible to lower the gate opening pressure.

Further, when being observed in the direction of compression of melted resin, the shape of the tip end 20A may be optionally established if the shape is such that it can open and close a gate 52 through which the melted resin passes, such as being U-shaped, V-shaped or a flat type. That is, the shape is not necessarily a blade.

Figure 4:
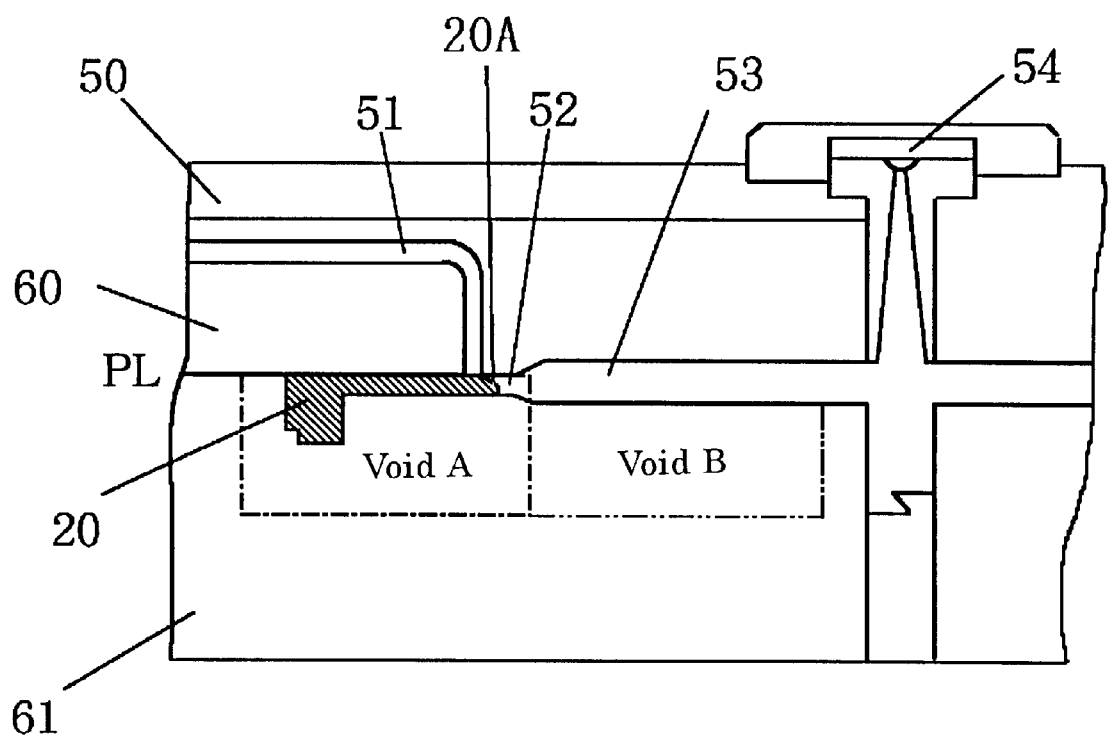
FIG. 4 is a general view showing a state where an in-mold gate opening and closing mechanism is incorporated in a mold.
Figure 4:
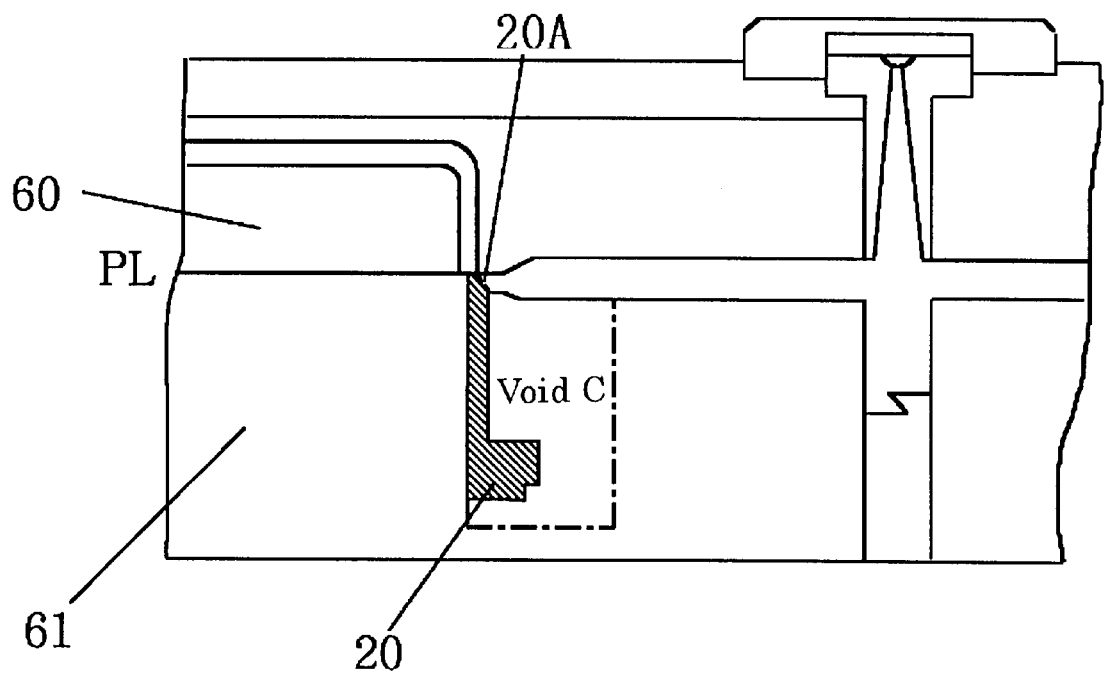

In addition, in an embodiment shown in Drawing A of FIG. 4, the gate pin 20A is disposed so that the moving direction of the gate pin 20A is made identical to the direction of the gate 52. And, as shown in Drawing B of FIG. 4, the gate pin 20 may be disposed so that the moving direction of the gate pin 20 becomes a direction orthogonal to the gate 52.

As shown in Drawing B of FIG. 1, a columnar space 30 is provided at the lower part of a gate void 11 inside the base body 10, into which a spring 31 and a moving cylinder 32 in which the spring 31 is accommodated are inserted. The lower end of a base end member 21 of the gate pin 20 is engaged with and fixed at the rear end stepped portion of the moving cylinder 32. Herein, "being engaged with" or "being fixed at" means not only "being caught by" but also may be "being fixed with a screw", or "being integrated by means of welding or with an adhesive agent". In the present invention, "being engaged with" or "being fixed at" may be used in this sense. Therefore, the gate pin 20 is always pressed in the direction of the gate void 11 by a force of the spring 31.

A stroke L of the gate pin 20 that closes the gate is basically limited to a length of a void of the base body 10, in which the base end member 21 of the gate pin 20 can slide. The stroke L may be set at around, for example, approximately 2.5 mm.

Since the force of the spring 31 becomes a force for pressing the tip end of the gate pin 20 in the direction of the gate void 11, it is necessary to adjust the force of the spring 31 in compliance with pressure of melted resin that is filled in the gate. That is, if the resin pressure in the gate void 11 during a filling of resin with a nozzle open becomes larger than the pressing force of the spring 31, the gate pin 20 is pushed against the pressing force of the spring 31 and is retreated from the position of the gate void 11. Next, as the filling of resin is completed and the nozzle is closed, the resin pressure in the gate void 11 becomes smaller than the pressing force of the spring 31, the gate pin 20 is reset to the position of the gate void 11 by the pressing force of the spring 31. At this time, the gate that is formed at the gate void 11 will be closed by the tip end 20A of the gate pin 20.

In order to achieve the above actions, the gate opening pressure may be set to, for example, approximately 50 through 300 kgf/cm$^2$ while the spring strength is set to, for example, approximately 30 kgf at maximum.

The pressing force of the spring 31 is adjusted by the spring pressure adjusting mechanism. That is, the pressing force thereof is adjusted by clockwise and counterclockwise rotations of a spring pressure adjusting nut 33, which presses the rear end of the spring 31, at the open end side of the moving cylinder 32. That is, if a positioning screw is turned clockwise since one end of the spring 31 is brought into contact with the bottom of the moving cylinder 32 and is not moved, the other end of the spring 31 is pressed by the spring pressure adjusting nut 33 and is caused to contract, wherein the pressing force acting on the gate pin 20 is accordingly increased. As a matter of course, if the spring pressure adjusting nut 33 is reversely rotated, the pressing force acting on the gate pin 20 can be decreased.

Figure 2:
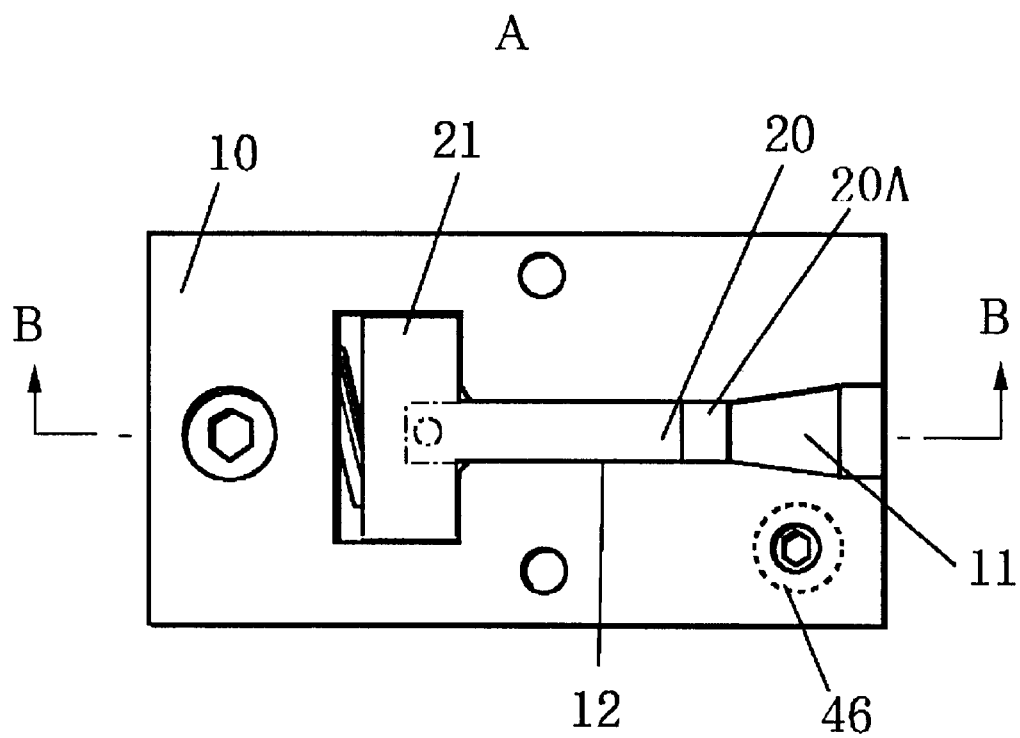
FIG. 2 shows a plan view and a longitudinal-sectional view of a second embodiment of an in-mold gate opening and closing mechanism according to the present invention.
Figure 2:
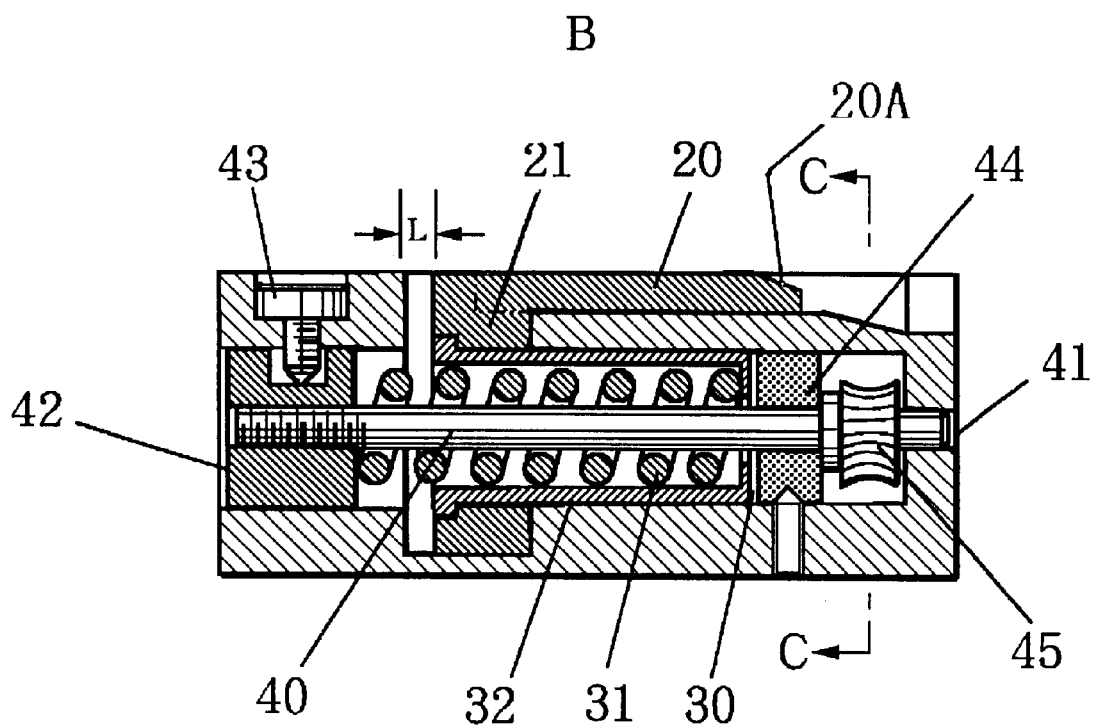
Figure 3:
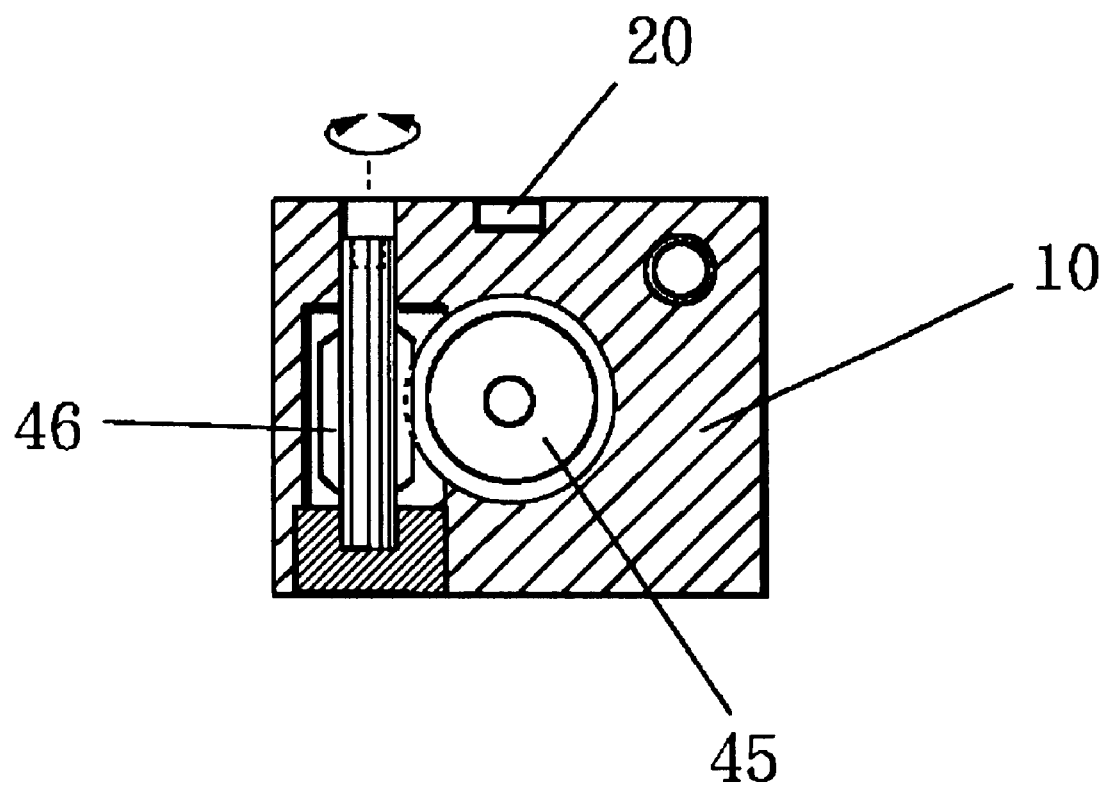
FIG. 3 is a cross-sectional view of the same drawing.

Next, on the basis of FIGS. 2 and 3, a description is given of the second embodiment of an in-mold gate opening and closing mechanism according to the present invention.

The basic structure including the base body 10, gate void 11, guide groove 12, gate pin 20, base end member 21, moving cylinder 32, etc., is identical to that of the first embodiment explained with reference to FIG. 1. However, the spring pressure adjusting mechanism that adjusts the pressing force of the spring 31 differs from that in the first embodiment. That is, in the present embodiment, a center shaft 40 is provided between a bearing hole (columnar hole) 41 prepared at the tip end side of the base body 10 and a bearing member 42 fixed in the columnar hole at the rear end side of the base body 10. Also, the fixing position of the bearing member 42 is determined by tightening a bolt 43. At the center shaft 40, a moving cylinder 32 and a spring 31 are disposed as in the above-described embodiment. In addition thereto, a stop bushing 44 and a worm wheel 45 are disposed thereat, wherein the worm wheel 45 is engaged with a worm 46 as shown in FIG. 3.

The spring pressure in the above-described second embodiment is adjusted as described below. That is, the position of the bearing member 42 is fixed by tightening the bolt 43, and if the worm 46 is operated for rotation since the bearing member 42 does not rotate, the worm wheel 45 that is engaged therewith interlockedly rotates, and the center shaft 40 carries out clockwise or counterclockwise rotations on the basis of engagement with the bearing member 42 by a screw mechanism. Therefore, the center shaft 40 moves in the direction of tightening the spring 31 by clockwise rotations and moves in the direction of opening the spring 31 by counterclockwise rotations, wherein the pressing force of the spring 31 is adjusted.

Although an in-mold gate opening and closing unit (hereinafter merely called a unit) is formed by the mechanism described above, it becomes necessary to incorporate the unit into a mold when actually utilizing the same. The incorporation thereof is explained with reference to FIG. 4.

Drawings A and B of FIG. 4 show examples of incorporating respective units into a mold. In a mode shown in Drawing A of FIG. 4, the gate pin 20 moves in the horizontal direction, and in a mode shown in Drawing B of FIG. 4, the gate pin 20 moves in the vertical direction. The operating direction of the gate pin 20, that is, an arrangement of the units is not limited to the modes shown in the drawings. It may be variously set on the basis of the shape and number of cavities 51 and the number of gates.

A lower die block 60 and a lower die block 61 are elements that are integrated together to constitute a lower mold as a whole. However, the units are incorporated in the lower die block 61.

In the mode shown in Drawing A of FIG. 4, voids A and B having sizes corresponding to the size of units are formed on the upper surface of the lower die block 61 as shown by a single-dashed chain line and a double-dashed chain line. First, a unit is vertically inserted into a void B from above, and next the unit is fixed by a bolt at an appointed position while being pressed into the side of the void A. When the unit is completely fixed, an insert having a recess, which becomes a runner 53, formed on the upper surface thereof is inserted into and fixed at the position of the void B. Also, the unit can be taken out by reversed procedures of the above.

In the mode shown in Drawing B of FIG. 4, no void for escape of units is required, wherein if the unit is only inserted in a void C provided on the upper surface of the lower die block 61 in the vertical direction, incorporation of the unit can be completed.

With regard to whether or not the gate pin 20 can adequately operate, it is necessary to adjust the pressing force of the spring 31 through actual molding. However, according to the invention, since it is easy to attach a unit to and detach the same from a mold, the adjustment can be remarkably efficiently carried out.

Where the embodiment shown in FIGS. 2 and FIG. 3 is applied to the mode of incorporation, which is shown in FIG. 4-A, it is possible to adjust the pressing force of the spring 31 without detaching the unit from the lower die block 61.

Also, the above-described case explained a system of directly incorporating a unit into the lower die block 61. However, such a system may be employed, in which a unit is incorporated in the lower die block 61 with the unit assembled in a liner (nesting).

Figure 31:
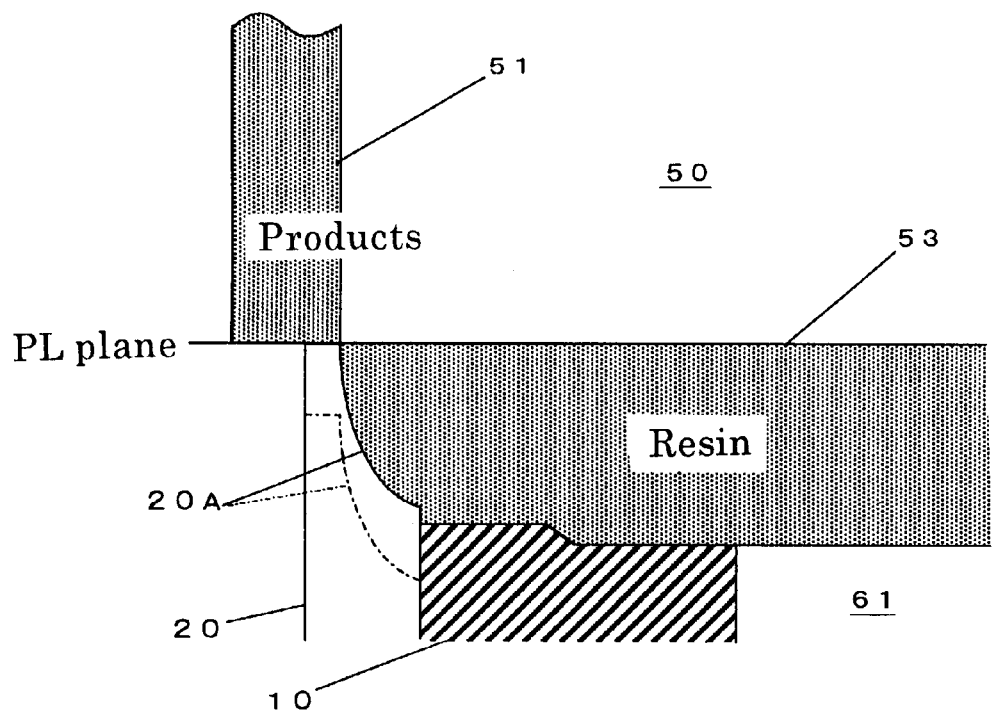
FIG. 31 is a general view showing one example of a relationship between the tip end of the gate pin and the PL plane.
Figure 31:
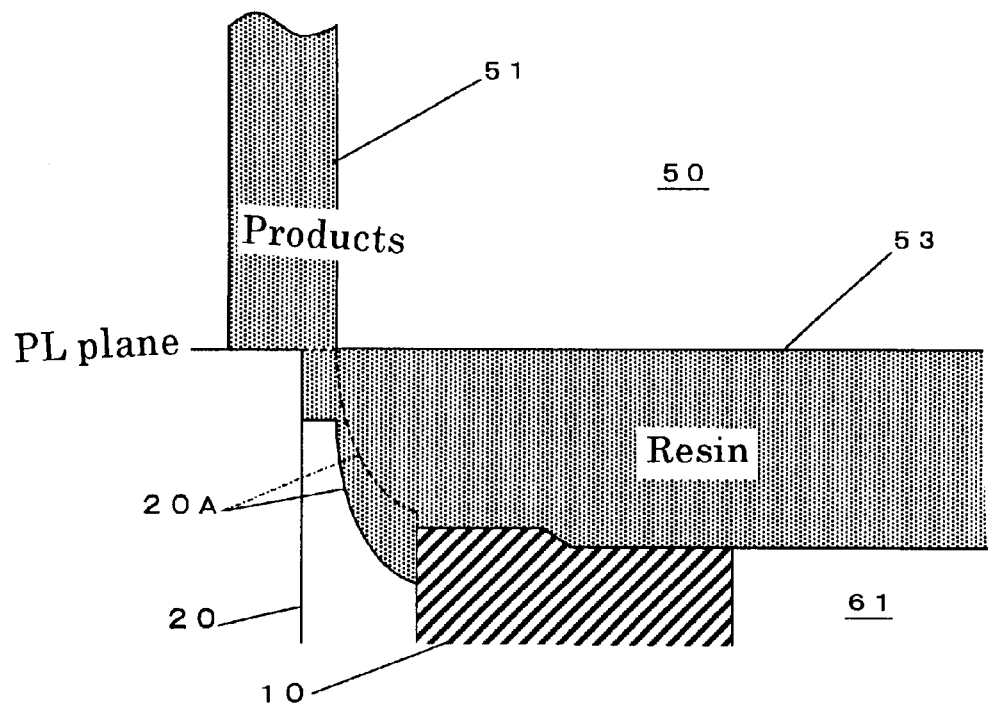

Also, it is preferable that, when incorporating the unit in a mold, the end portion of the tip end 20A of the gate pin 20 is disposed at a position where the same is not caught by the PL plane with the gate closed (Drawing A of FIG. 31) as shown in FIG. 31. Since no case arises where resin is placed between the PL plane and the tip end 20A when the gate pin 20 completely presses resin, by determining the position where the tip end 20A of the gate pin 20 is not caught by the PL plane with the gate closed, the gate pin 20 can efficiently return. Therefore, the gate closing can be smoothly carried out. In addition, in the mode shown in FIG. 31, a gate pin 20, the shape of the tip end 20A of which is just like C in FIG. 30, may be used.

Figure 5:
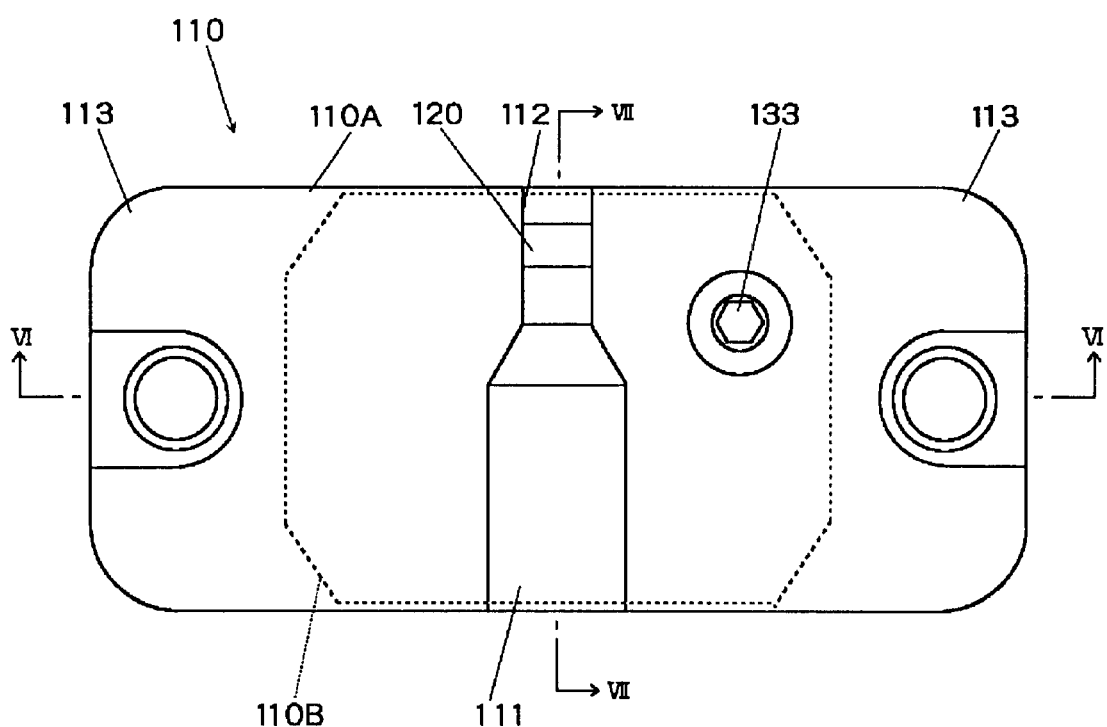
FIG. 5 is a plan view showing a third embodiment of an in-mold gate opening and closing apparatus according to the present invention.
Figure 6:
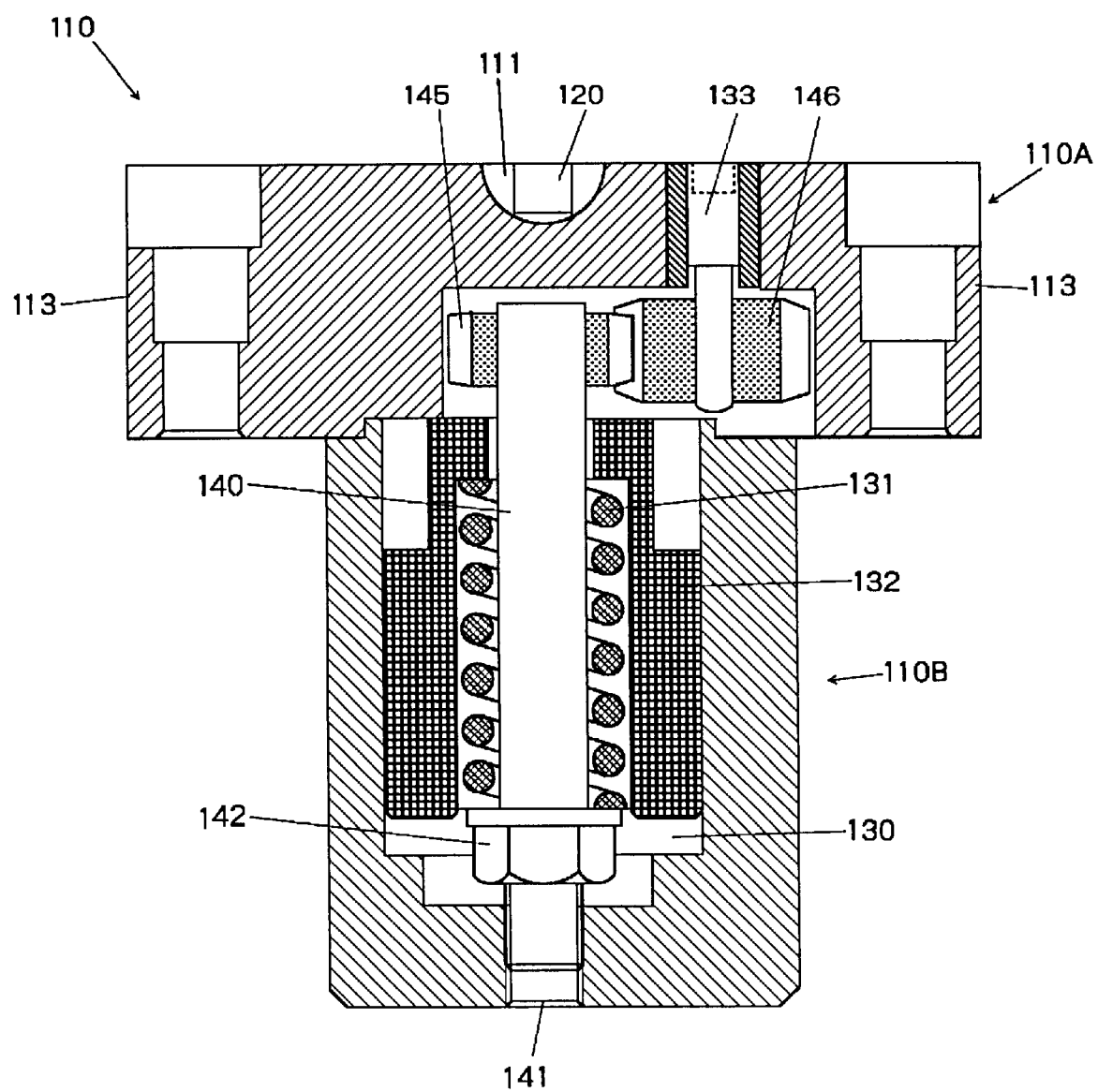
FIG. 6 is a sectional view taken along the line VI—VI in FIG. 5.
Figure 7:
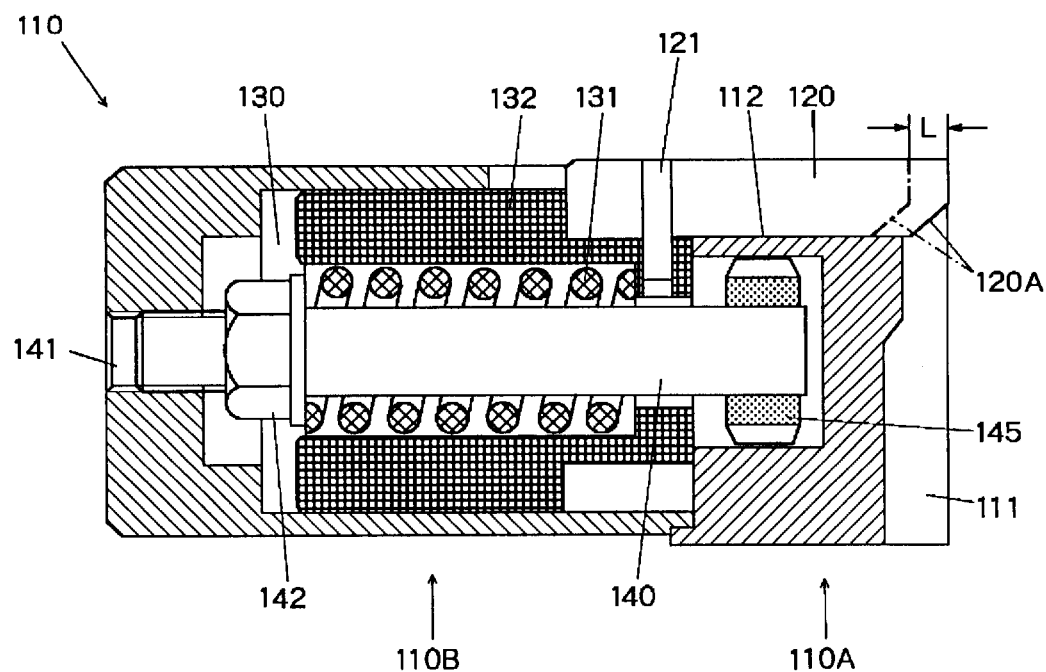
FIG. 7 is a sectional view taken along the line VII—VII in FIG. 5.

Next, in compliance with FIGS. 5 through 7, a description is given of the third embodiment of an in-mold gate opening and closing apparatus according to the invention.

A base body 110 is a metallic block that may be utilized in a state where the same is incorporated in a mold (lower die) as described later. A flange portion 113 having the upper surface portion that is flush with the upper surface portion of the corresponding mold (lower mold) when being incorporated in a mold (lower mold) is provided on the upper part 110A of the base body 110, and one unit in which various components described later are incorporated is formed on the surface of the upper part 110A of the base body 110 and in the inner space of the lower part 110B thereof.

In the present embodiment, although a portion that protrudes from the width of the lower part 110B by making the upper part 110A of the base body 110 wider than the lower part 110B is constituted to be a flange portion 113, the invention is not limited to this mode. The flange portion 113 may be constituted by making only a part including the upper surface of the upper part 110A of the base body 110 wider than the other composed parts of the base body 110.

Further, the upper part 110A and the lower part 110B of the base body 110 are fixed by a setting means (not illustrated) such as bolts, etc.

As shown in FIG. 5, a gate void 111 is formed at the end portion of the upper surface of the base body 110, and a gate pin 120 is disposed in a guide groove 112 that is provided adjacent to the gate void 111. Also, dimensions of the guide groove 112 with respect to the depth and width thereof correspond to the dimensions of the gate pin 120 regarding its thickness and width, wherein the dimensions are kept so accurate that the melted resin does not leak out of the sliding planes of both of the guide groove 112 and the gate pin 120.

As shown in FIGS. 6 and 7, a columnar space 130 is provided in the base body 110 (mainly the lower part 110B), into which a spring 131 and a moving cylinder 132 for accommodating the spring 131 are inserted.

The gate pin 120 is connected to the moving cylinder 132 by a gate pin fixing member 121 such as a screw. Therefore, the gate pin 120 is always pressed in the direction of the gate void 111 by a force of the spring 131. In addition, in the present embodiment, a coil spring is used as the spring 131. However, in the present invention, the spring is not limited to a coil spring, wherein other spring members such as a plate spring may be used.

The construction of the gate pin 120 is similar to that of the above-described gate pin 20.

A stroke L of the gate pin 120 that closes the gate is basically limited to a length of a void of the base body 110, in which the moving cylinder 132, to which the gate pin 120 is connected, can slide. The stroke L may be set at around, for example, approximately 2.5 mm.

Since the force of the spring 131 becomes a force for pressing the tip end of the gate pin 120 in the direction of the gate void 111, it is necessary to adjust the force of the spring 31 in compliance with pressure of melted resin that is filled in the gate. That is, if the resin pressure in the gate void 111 during a filling of resin with a nozzle open becomes larger than the pressing force of the spring 131, the gate pin 120 is pushed against the pressing force of the spring 131 and is retreated downward from the position of the gate void 111. Next, as the filling of resin is completed and the nozzle is closed, the resin pressure in the gate void 111 becomes smaller than the pressing force of the spring 131, the gate pin 120 is reset to the position of the gate void 111 by the pressing force of the spring 131. At this time, the gate that is formed at the gate void 111 will be closed by the tip end of the gate pin 120.

That is, according to the in-mold gate opening and closing apparatus of the present invention, it is possible to open and close the in-mold gates without using a fluid pressure means exclusively provided as in the prior art and any peripheral power mechanism, which is actuated in line with movement of a movable mold.

Since the in-mold gates are opened and closed by utilizing the pressure of resin to be injected, it is not necessary to adjust the injection timing of resin and the opening and closing timing of the in-mold gates.

In order to achieve the above-described actions, the gate opening pressure may be set to, for example, approximately 50 through 300 kgf/cm$^2$ while the spring strength is set to, for example, approximately 300 kgf at maximum.

The pressing force of the spring 131 is adjusted by clockwise and counterclockwise rotations of the spring pressure adjusting nut 133, which is provided on the upper surface side of the base body 110. That is, if the spring pressure adjusting nut 133 is operated for rotations, a gear 145 engaged with the corresponding gear 146 is rotated by the gear 146. Since the center shaft 140, which is the axis of the corresponding gear 145, rotates by rotations of the gear 145, the spring receiving nut 142, which is set so as not rotate, moves in the axial direction of the center shaft 140. The spring receiving nut 142 moves in the direction of tightening the spring 131 when the gear 145 and the center shaft 140 rotate clockwise (the spring pressure adjusting nut 133 reversely rotates), and moves in the direction of opening the spring 131 when these rotate counterclockwise (the spring pressure adjusting nut 133 normally rotates), wherein the pressing force of the spring 131 is adjusted.

In addition, adjustment of the spring pressure is not limited to the mode described in the present embodiment, in which the above-described gears 145 and 146 are employed. For example, the center shaft 140 itself may move to adjust the spring pressure, and any means that have been publicly known and used may be employed without any limitation even if these are of other structures that can adjust the pressing force of the spring 131. For example, it is possible to adjust the pressing force of the spring 131 by, for example, a levering action by rotation operations of the spring pressure adjusting nut 133.

Figure 8:
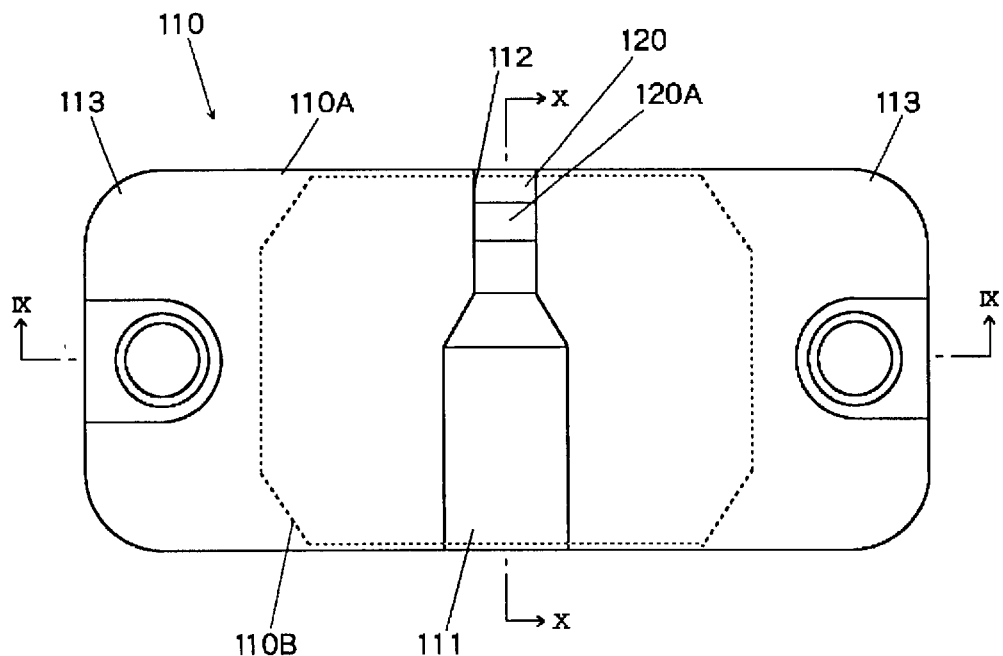
FIG. 8 is a plan view showing a fourth embodiment of an in-mold gate opening and closing apparatus according to the present invention.
Figure 9:
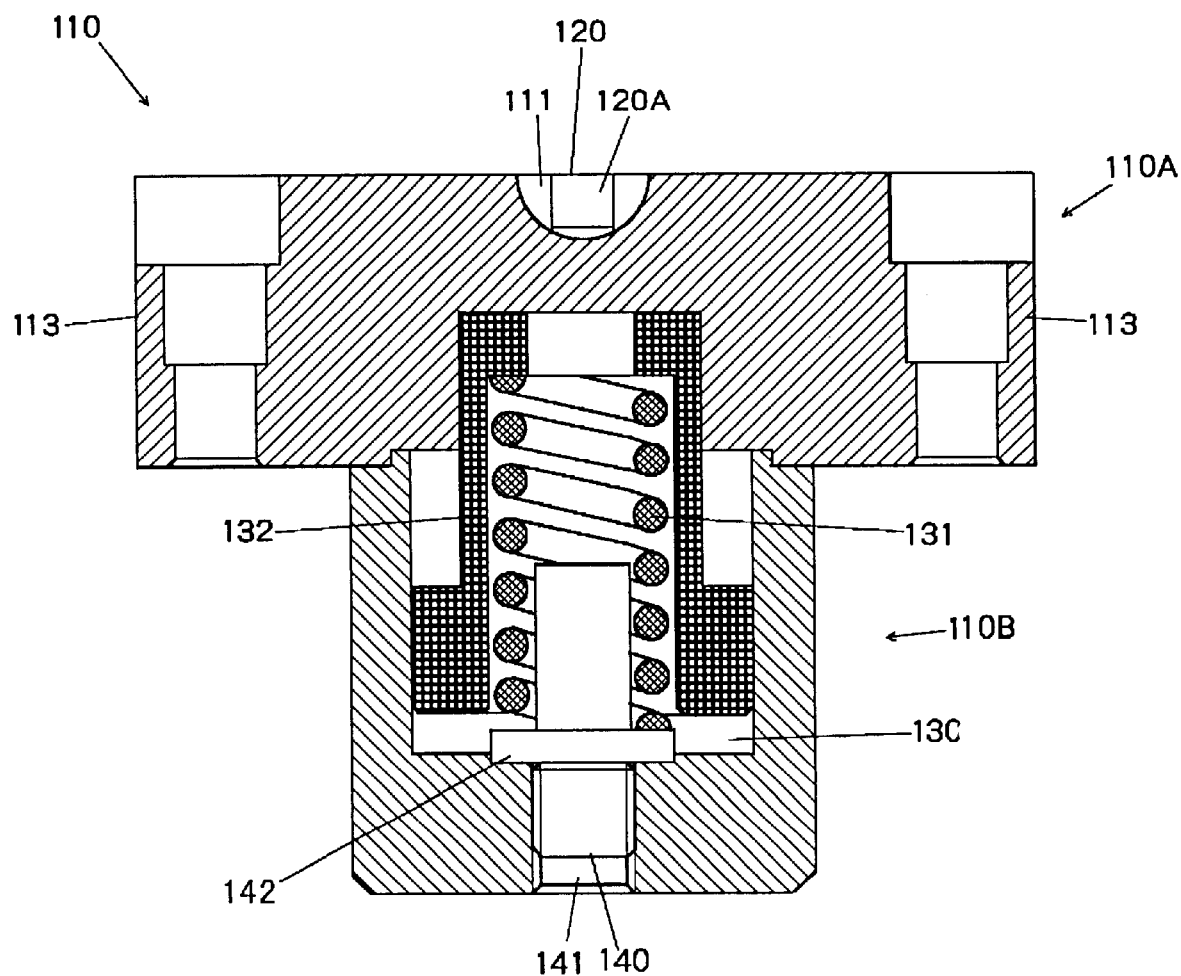
FIG. 9 is a sectional view taken along the line IX—IX in FIG. 8.
Figure 10:
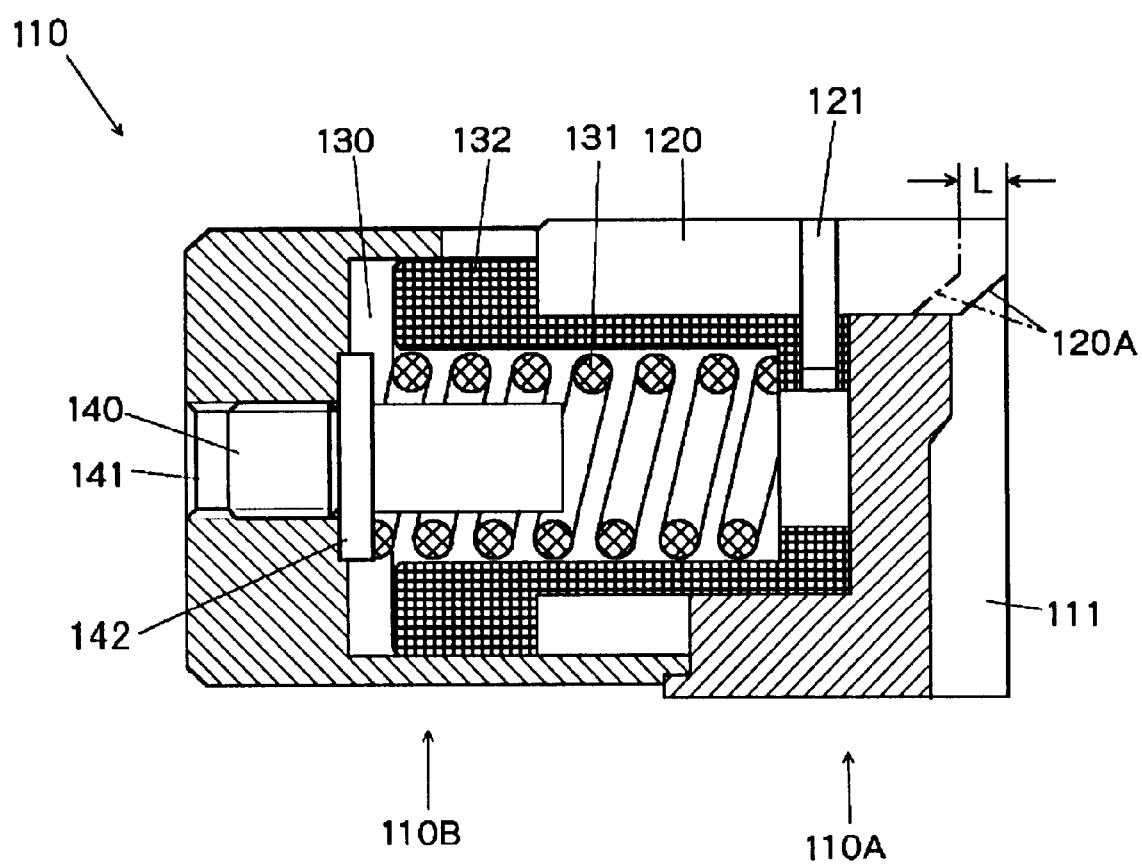
FIG. 10 is a sectional view taken along the line X—X in FIG. 8.

Next, based on FIGS. 8 through 10, a description is given of the fourth embodiment of an in-mold gate opening and closing apparatus according to the invention.

The basic construction comprising a base body 110, a gate void 111, a guide groove 112, a gate pin 120, a moving cylinder 132, etc., is identical to that of the third embodiment described above, wherein a mechanism for adjusting the pressing force of a spring 131 differs from that in the third embodiment. That is, in the present embodiment, no spring pressure adjusting nut 133 nor gear 146 and gear 145 are provided. However, by rotating the center shaft 140 from a bearing hole 141 that is a hole drilled in the base body 110 (the lower part 110B thereof), the spring receiving nut 142 moves to adjust the pressing force of the spring 131. A mechanism to increase and decrease the pressing force of the spring 131 is identical to that of the above-described first embodiment.

An in-mold gate opening and closing unit (hereinafter merely called a unit) is formed of the above-described mechanism. However, it becomes necessary to incorporate the unit into a mold when actually utilizing the same.

Hereinafter, a description is given of the incorporation of the unit with reference to FIGS. 11 through 14.

Figure 11:
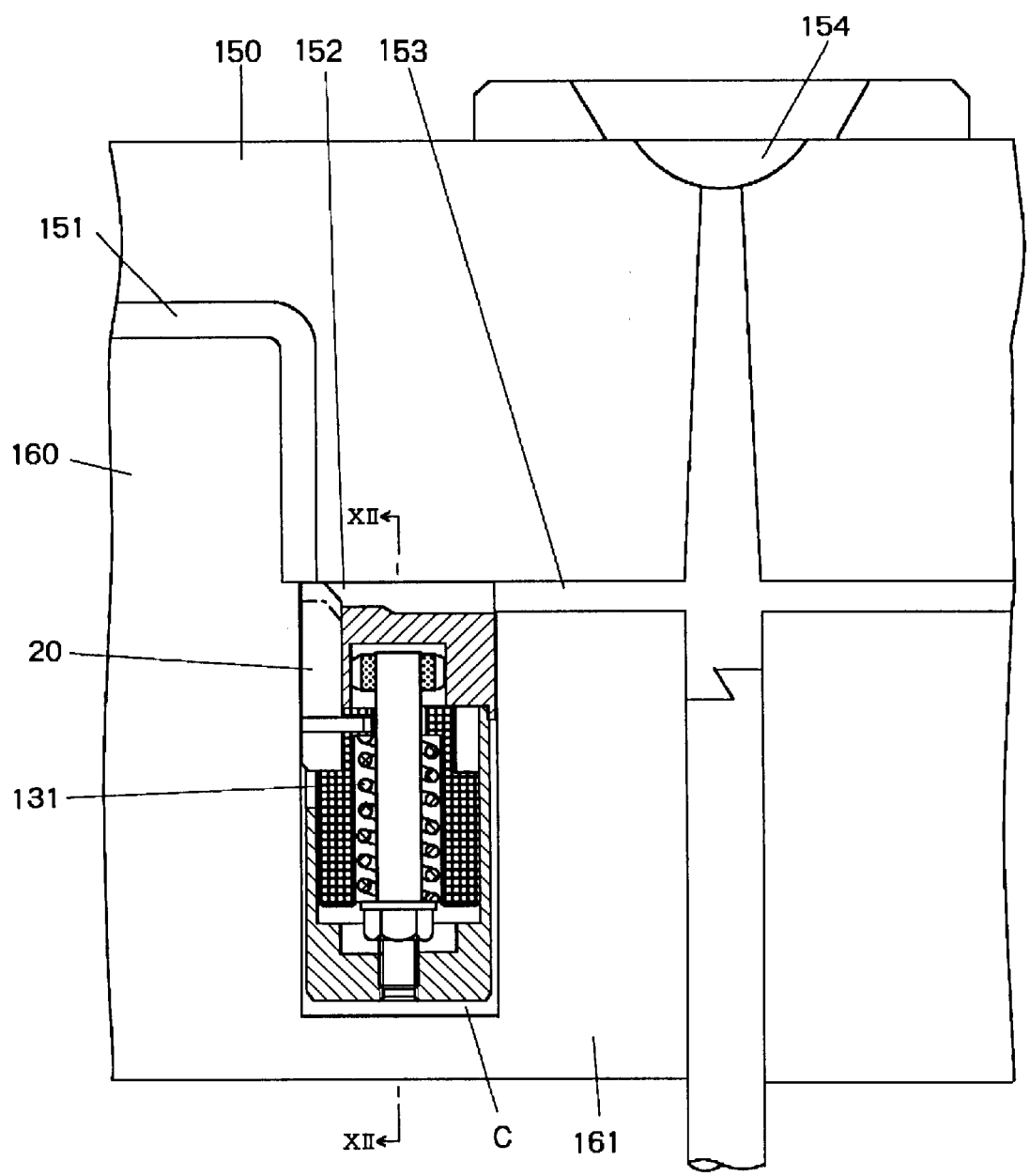
FIG. 11 is a general sectional view showing a state where an in-mold gate opening and closing apparatus according to the third embodiment shown in FIGS. 5 through 7 is incorporated in a mold.
Figure 12:
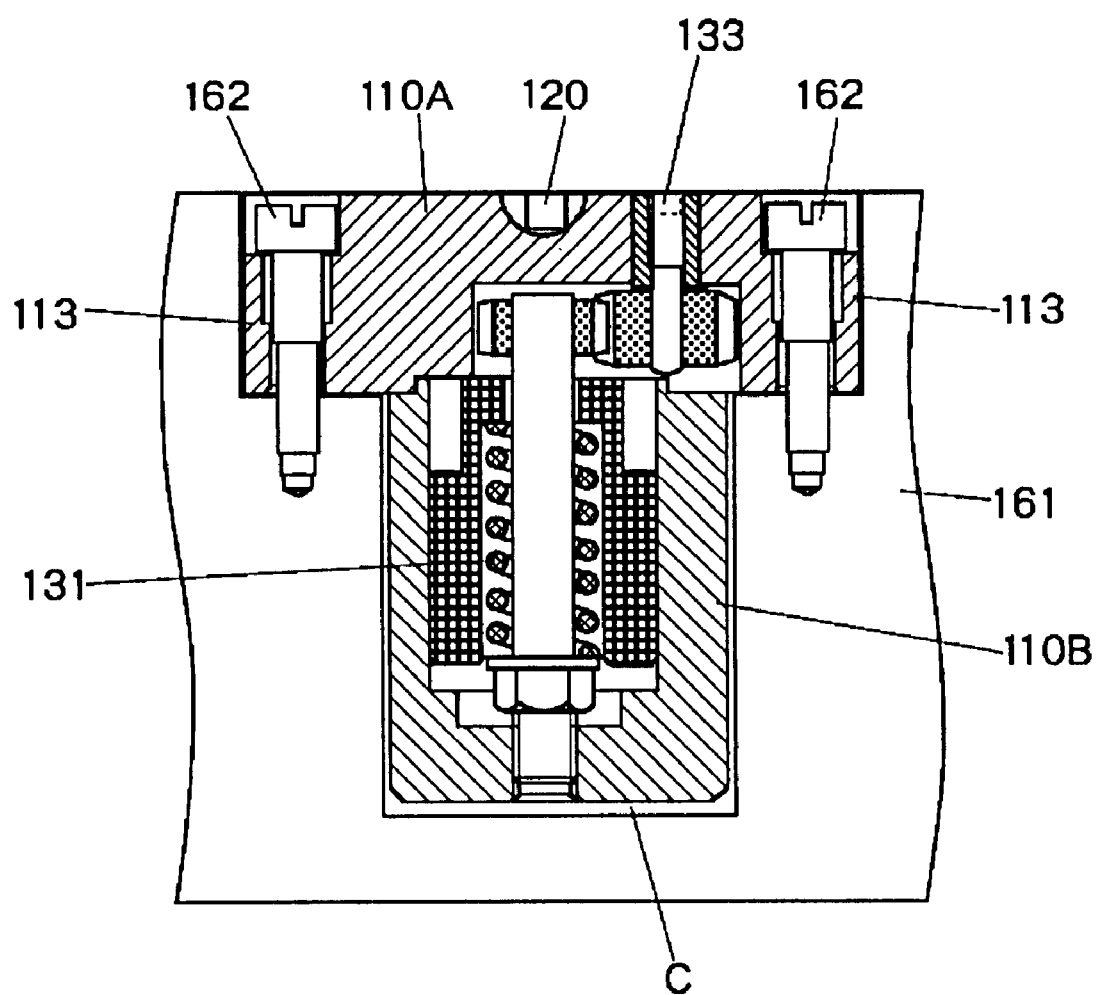
FIG. 12 is a sectional view taken along the line XII—XII in FIG. 11.
Figure 13:
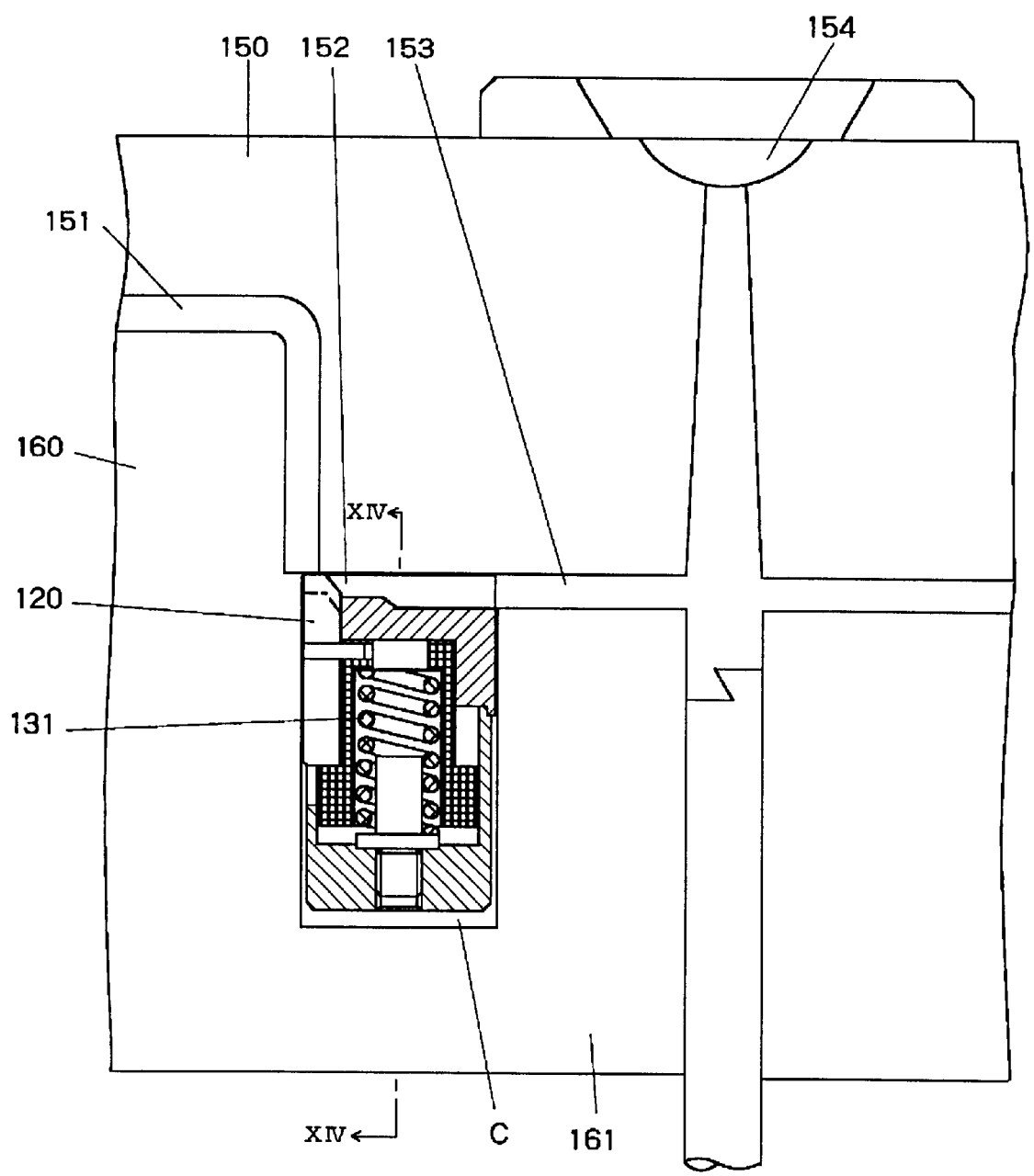
FIG. 13 is a general sectional view showing a state where an in-mold gate opening and closing apparatus according to the fourth embodiment shown in FIGS. 8 through 10 is incorporated in a mold.
Figure 14:
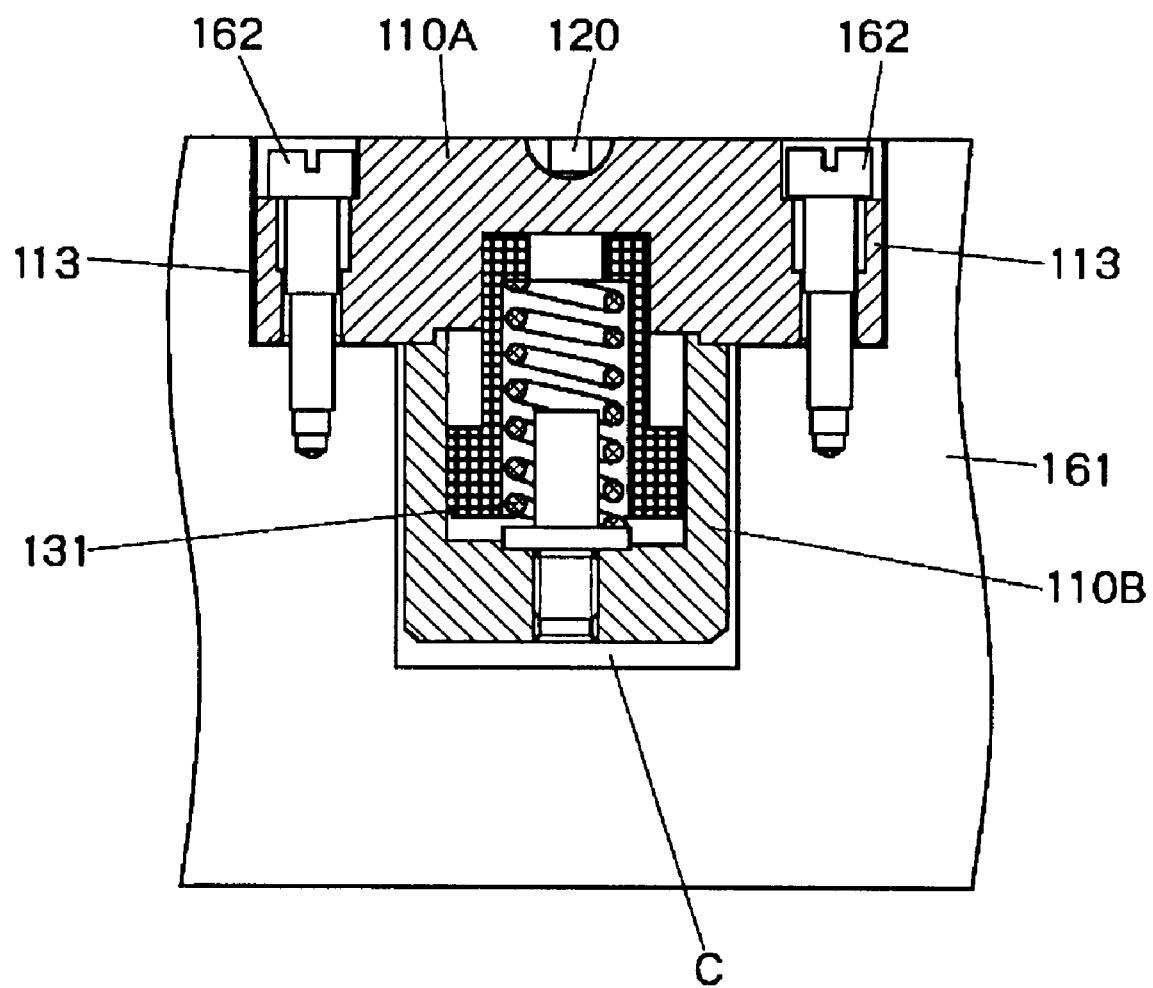
FIG. 14 is a sectional view taken along the line XIV—XIV in FIG. 13.
Figure 15:
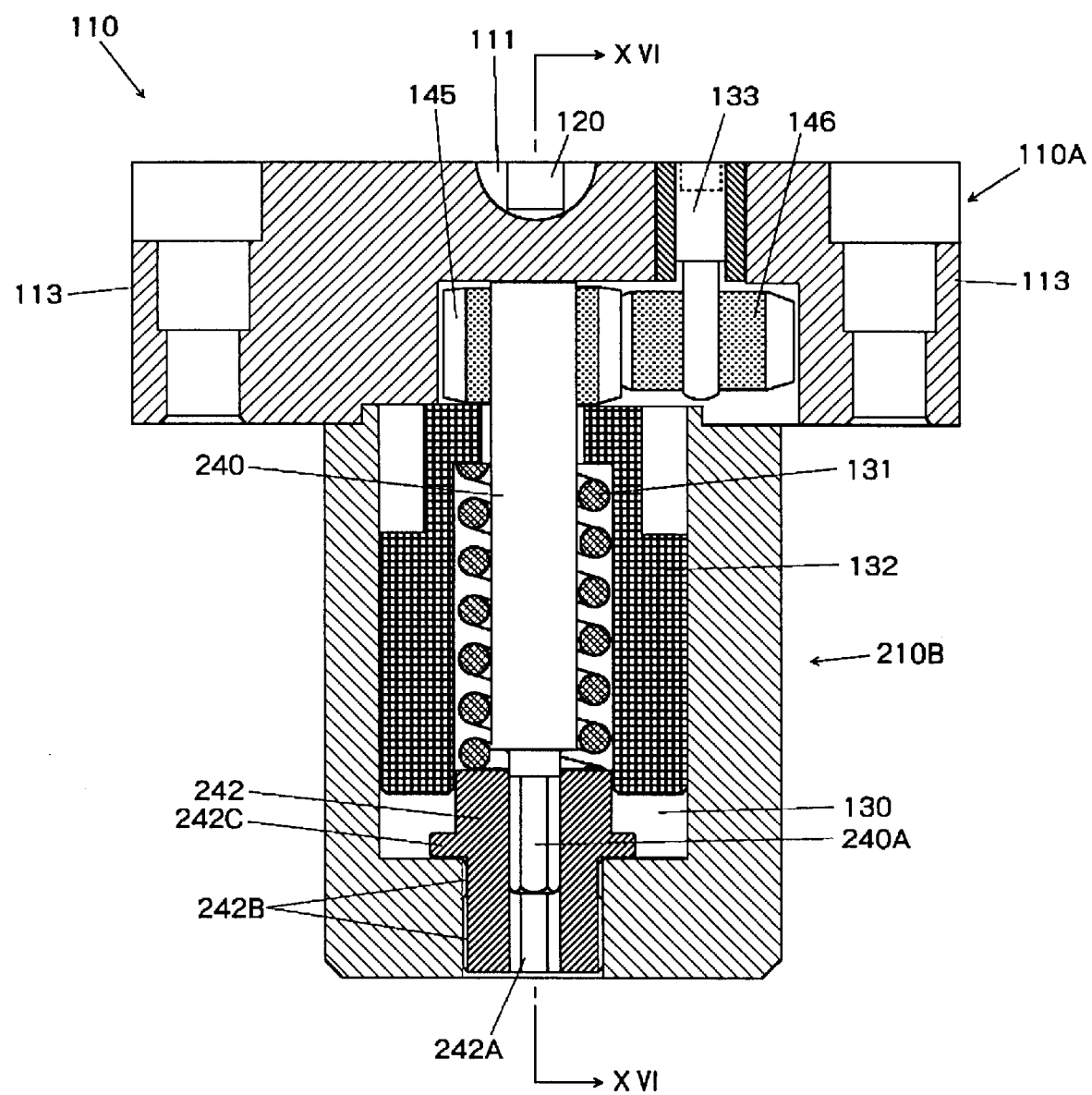
FIG. 15 is a sectional view showing a fifth embodiment of an in-mold gate opening and closing apparatus according to the present invention.

FIGS. 11 and 12 show an example in which an in-mold gate opening and closing apparatus according to the third embodiment, which is shown in FIGS. 5 through 7, is incorporated, and FIGS. 13 and 14 show an example in which an in-mold gate opening and closing apparatus according to the fourth embodiment, which is shown in FIGS. 8 through 10, is incorporated.

As shown in FIGS. 11 through 14, a mold to which the present invention is applied is composed of an upper die 150 and a lower die 160, wherein the unit is incorporated in the lower die block 161 of the lower die 160.

As shown in FIGS. 11 through 14, with the in-mold gate opening and closing apparatus according to the invention, the unit can be incorporated by only inserting the same in a void C, which is provided on the upper surface of the lower die block 161, in the vertical direction.

When incorporating the unit, a step that receives a flange portion 113 of the base body 110 (the upper part 110A thereof) is formed in the void C, and such a construction is employed, in which the upper surface of the flange portion 113 becomes flush with the upper surface of the lower die block 161 with the lower surface of the flange portion 113 brought into contact with the step in the corresponding void C.

After the unit is incorporated in the void C of the lower die block 161, the unit is fixed with a fixing member 162 such as a bolt, etc.

In regard to whether or not the gate pin 120 adequately operates with respect to pressure of injection resin, it becomes necessary to adjust the pressing force of the spring 131 by actually carrying out molding. However, according to the second embodiment of the invention, since it is remarkably easy to attach the unit to and detach the same from a mold, such an operation can be remarkably efficiently carried out.

When adjusting the pressing forces of a number of units, since the pressing forces can be individually adjusted remarkably easily, it becomes easy to change a position, at which a weld line occurs, to an appointed position by varying a balance of the pressing forces in a case of multiple gate molding. Since the pressing forces can be adjusted so as to correspond to respective molding products even if these do not have the same size in cases where a plurality of products are molded at the same time, uniform molding can be carried out regardless of the sizes of molding products.

As has been made clear in FIGS. 11 and 12, in a case where the third embodiment of an in-mold gate opening and closing apparatus shown in FIGS. 5 through 7 is applied, it becomes possible to adjust the pressing force of the spring 131 without detaching the unit from the lower die block 161.

Therefore, according to the third embodiment, the pressing force can be remarkably easily adjusted during molding.

In particular, as in the case of multiple gate molding or producing a plurality of molding products, where resin molding is carried out with a plurality of units incorporated in a mold, it is possible to adjust the pressing forces of the springs without detaching a plurality of units whenever molding. Therefore, work efficiency can be remarkably improved.

Next, with reference to FIGS. 15 through 18, a description is given of the fifth embodiment of an in-mold gate opening and closing apparatus according to the invention.

The present embodiment is provided with a construction for adjusting the amount of movement of escape actions of the gate pin 120 in addition to adjustment of the pressing force of the spring 131 with respect to the gate pin 120 in the above-described third and fourth embodiments. The range of adjustment of the amount of movement for escape actions is from full opening of the gate to full closing thereof, wherein the adjustment can be carried out step-free.

In FIGS. 15 through 18, parts that are the same as those in the third and fourth embodiments shown in FIGS. 5 through 14 are given the same reference numbers while parts that are different from those in the former two embodiments are given different reference numbers. The lower part 210B of the base body is basically provided with a construction that is similar to the lower part 110B of the base body. In the present embodiment, a unit is incorporated in a mold as in the third and fourth embodiments.

Also, the corresponding fifth embodiment not only is a mode in which a construction for adjusting the amount of movement of escape actions of the gate pin 20 is added to adjustment of the pressing force of the spring 131 with respect to the gate pin 20 in the third and fourth embodiments described above, but also includes a mode in which the construction similar thereto is added in the first and second embodiments described above.

The pressing force of the spring 131 is adjusted by clockwise and counterclockwise rotation of the spring pressure adjusting nut 133 that is prepared on the upper surface side of the base body 110 as in the third embodiment described above. That is, by rotating the spring pressure adjusting nut 133, a gear 145 that is engaged with a gear 146 can rotate via the corresponding gear 146. With rotations of the gear 145, a center shaft 240 that is an axis of the corresponding gear 145 also rotates, whereby an adjusting member 242, which functions as a spring receiver, rotates together with the center shaft 240 to move in the axial direction, and the pressing force of the spring 131 varies by movement of the adjusting member 242.

Although the adjusting member 242 moves in the axial direction by rotations of the center shaft 240 as in the spring receiving nut 142 in the above-described third embodiment, the construction regarding the movement differs from the above.

That is, although, in the third embodiment, the spring receiving nut 142 is screwed in the tip end of the center shaft 140, the tip end portion 240A of the center shaft 240 is slidably inserted into the through-hole 242A of the adjusting member 242 in the axial direction in the present embodiment. The tip end portion 240A is made hexagonal pillar-shaped, and the through-hole 242A into which the corresponding tip end portion 240A is inserted has an inner shape which corresponds with the hexagonal pillar shape, whereby although the tip end portion 242A can slide in the axial direction, the same does not rotate.

In addition, the adjusting member 242 is attached to the lower part 210B of the base body in a screwed-in state at the threaded portion 242B. Therefore, the adjusting member 242 rotates together at the same time when the center shaft 240 rotates. However, since the corresponding adjusting member 242 is attached to the lower part 210B of the base body in a screwed-in state, the adjusting member moves in the axial direction by the threaded portion 242B. By movement of the adjusting member 242, the pressing force of the spring 131 is adjusted.

Further, the adjusting member 242 not only functions as a spring receiver of the spring 131 and adjusts the pressing force thereof but also is provided with an adjusting feature of the amount of movement of escape actions of the gate pin 120. That is, it is possible to limit the maximum moving position of the moving cylinder 132 by a stopper portion 242C that is provided at the outer circumference of the adjusting member 242.

Figure 16:
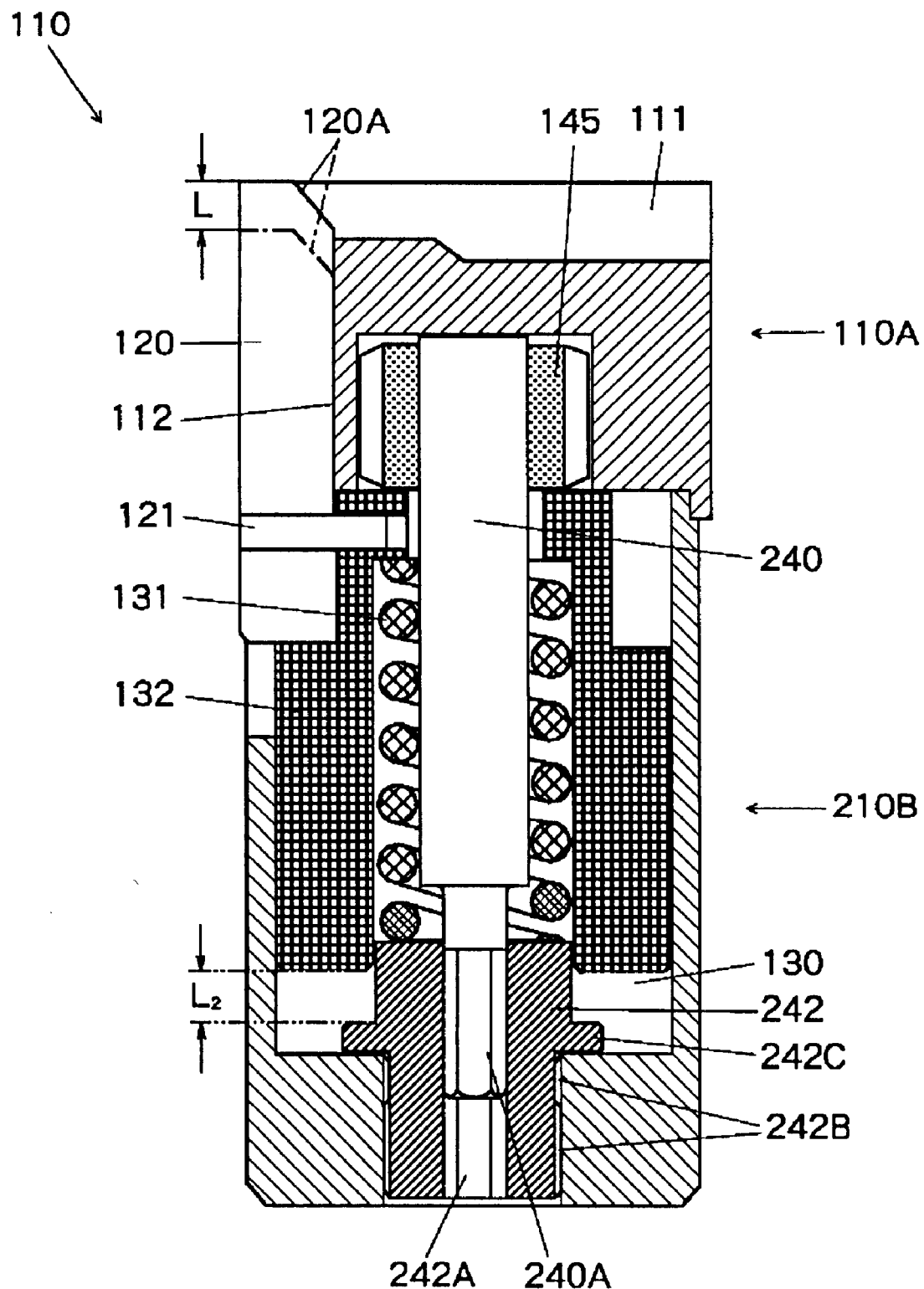
FIG. 16 is a sectional view taken along the line XVI—XVI in FIG. 15.

In a state shown in FIG. 16, since the adjusting member 242 is positioned at the extremely lower position, that is, the stopper portion 242C is located at the extremely lower end of the columnar space 130, a relationship between the stroke L of the gate pin 120 and a movement tolerance $L_2$ of the moving cylinder 132 is $L \leq L_2$. Accordingly, there is no limitation with respect to the movement stroke L of the moving cylinder 132 and gate pin 120, wherein the gate can be fully opened.

Figure 17:
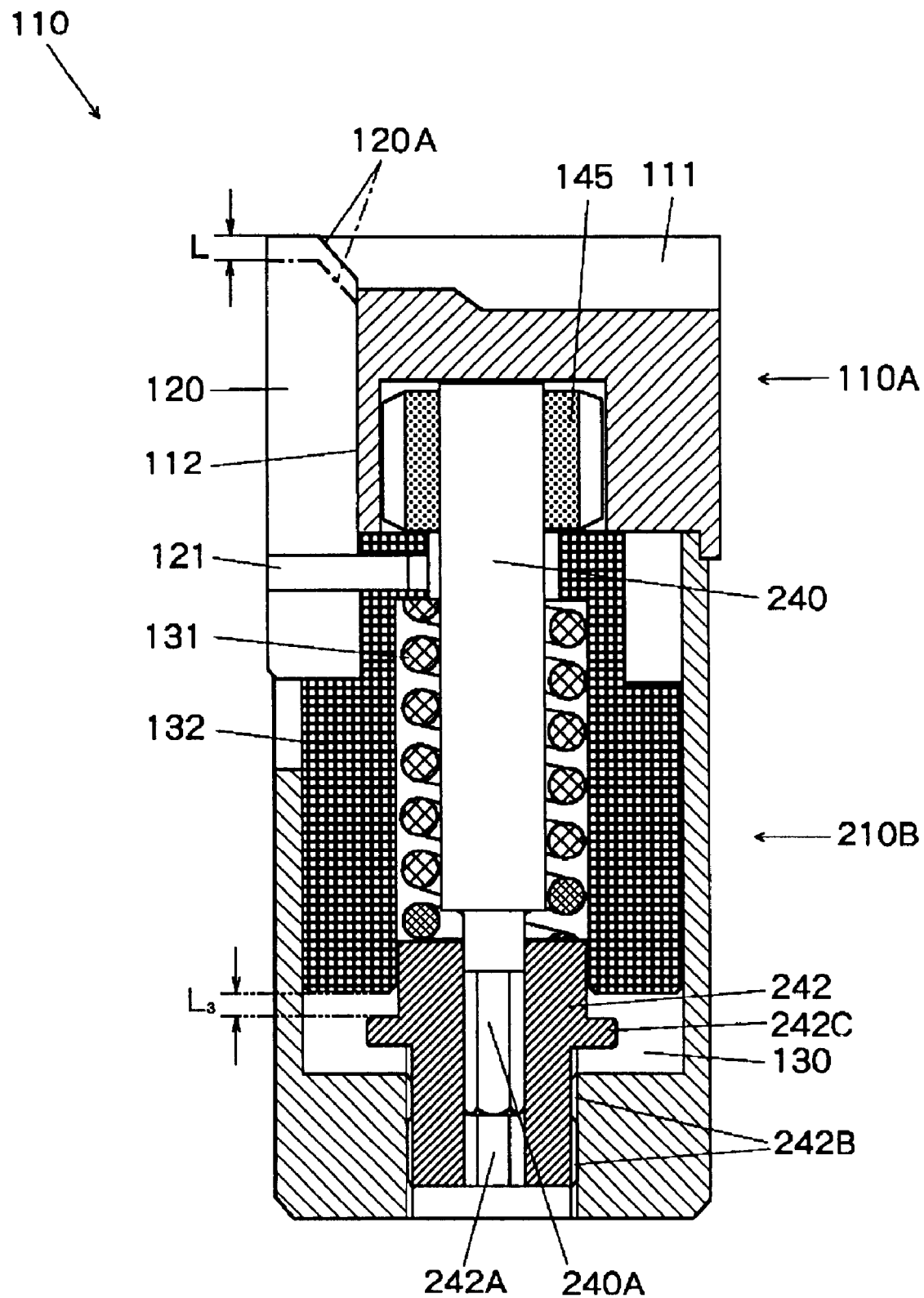
FIG. 17 is a sectional view showing another state in FIG. 16.

To the contrary, if by rotating the spring pressure adjusting nut 133, the pressing force of the spring 131 is increased and the stopper portion 242C is raised as shown in FIG. 17, $L=L_3$ is established if the movement tolerance $L_3$ of the moving cylinder 132 is set to half the movement tolerance $L_2$ in FIG. 16. Therefore, the movement stroke L of the gate pin 120 can be limited to half, wherein the gate is not fully opened but is limited to a semi-open state.

Figure 18:
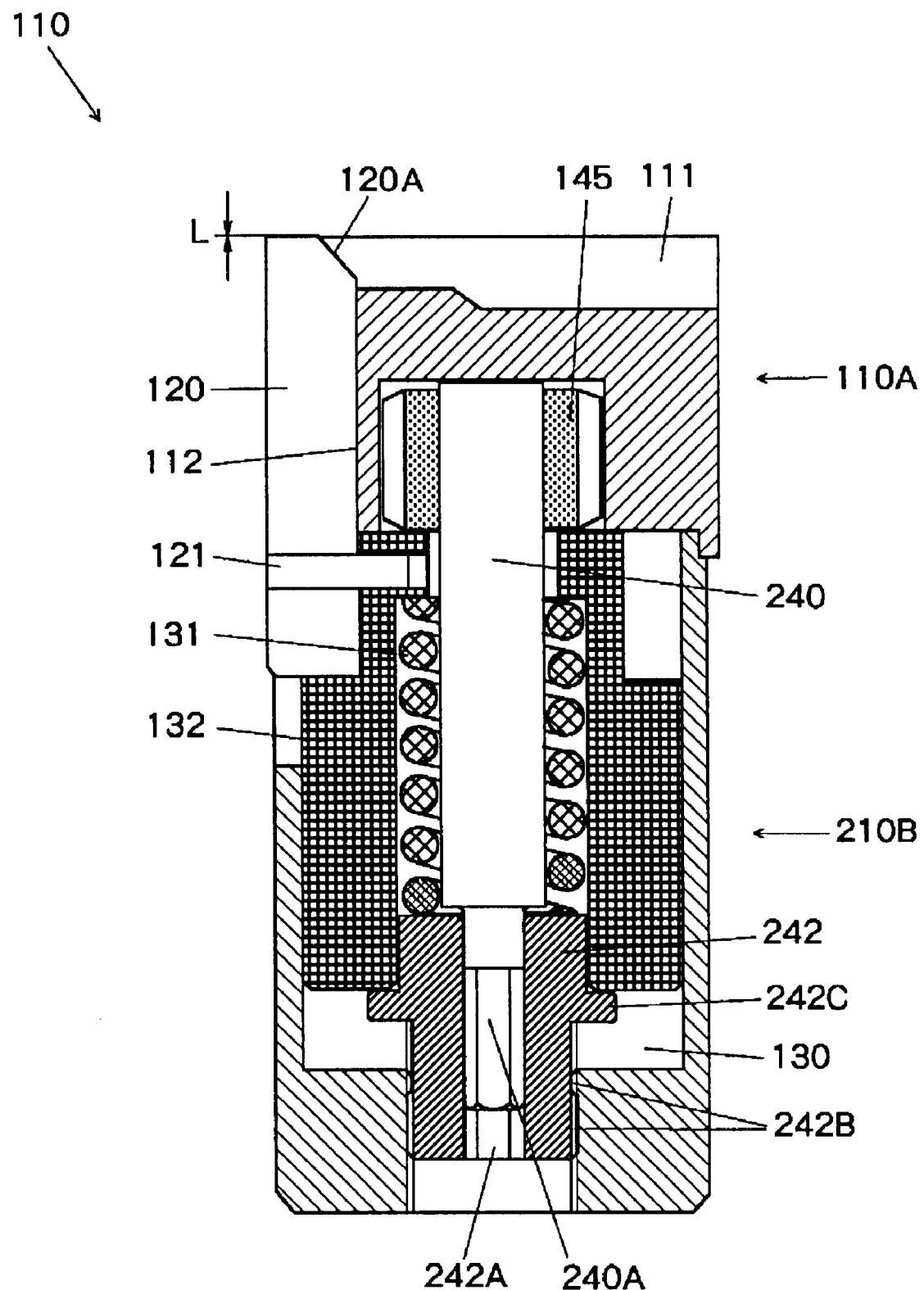
FIG. 18 is a sectional view showing still another state in FIG. 16.
Figure 19:
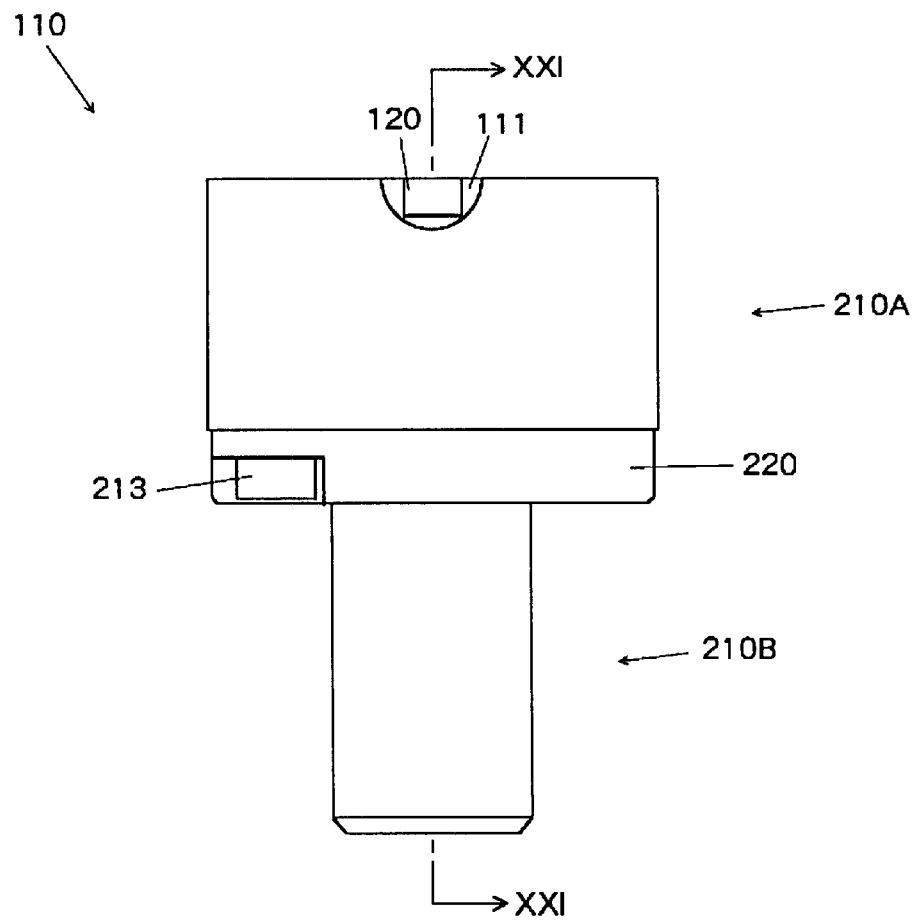
FIG. 19 is a front elevational view showing a sixth embodiment of an in-mold gate opening and closing apparatus according to the present invention.

In addition, if, by rotating the spring pressure adjusting nut 133, as shown in FIG. 18, the stopper portion 242C is raised until the same is brought into contact with the moving cylinder 132 at the extreme upper limit position, and the moving cylinder 132 is fixed so as not to move any longer, the movement stroke L of the gate pin 120 becomes zero (L=0), wherein the gate is always closed.

As has been described on the basis of FIGS. 15 through 18, by moving the adjusting member 242 in the axial direction of the center shaft 240, the movement stroke L of the gate pin 120 can be adjusted step-free from full opening of the gate to full closing of the gate.

Therefore, the gate balance of multiple gates can be sufficiently adjusted by only adjusting the pressing force of the spring and the movement stroke of the gate pin. Therefore, the gate balance can be easily adjusted. In particular, according to the present embodiment, not only can adjustment of the gate balance be facilitated even in a case of set-by-set molding in which weight ratios are remarkably different from each other, but also it is possible to close or shut off only unnecessary gates where gates are required in only some products in a mold for producing a plurality of products.

Also, shapes of the tip end portion 240A and through-hole 242B are not limited to a hexagon, wherein various shapes such as a polygon, an ellipse, etc., may be employed if the shape is such that the tip end portion 240A is able to slide in the axial direction with the same inserted in the through-hole 242B and the adjusting member 242 can rotate together with the center shaft 240.

Still further, an inverted construction of the present embodiment may be employed, in which a male threaded portion is formed at the above-described tip end portion 240A and a female threaded portion is formed at the through-hole portion 242A with both of the threaded portions screwed within each other, the above-described threaded portion 242B is made polygonal or elliptical without forming any screw, and the adjusting member 242 is made slidable in the axial direction with respect to the lower part 210B of the base body and is inserted therein so as not to rotate, wherein the adjusting member 242 may be constructed to be movable in the axial direction. In this case, by rotation of the center shaft 240, the adjusting member 242 will move in the axial direction without rotating together.

Next, a description is given of the sixth embodiment of an in-mold gate opening and closing apparatus according to the present invention with reference to FIGS. 19 through 23. Also, in FIGS. 19 through 23, parts that are the same as those in the third and fourth embodiments shown in FIGS. 5 through 14 described above are given the same reference numbers while parts that differ from those in the previous embodiments are given different reference numbers.

The present embodiment is provided with a construction that adjusts the amount of movement (movement stroke) of escape actions of the gate pin 120 as in the above-described fifth embodiment, and the range of adjusting the amount of movement with respect to the escape actions can be adjusted step-free from full opening of a gate to full closing thereof.

Further, the sixth embodiment has a more simplified construction than the construction of the third, fourth and fifth embodiments, in particular, the lower part 110B of the base body and the inner structure thereof.

That is, the third and fourth embodiments are composed of five components such as the lower part 110B of the base body, center shaft 140, spring 131, moving cylinder 132 and spring receiving nut 142. However, the present embodiment is composed of four components include the lower part 210B of the base body, center shaft 240, spring 131 and adjusting member 243.

Figure 20:
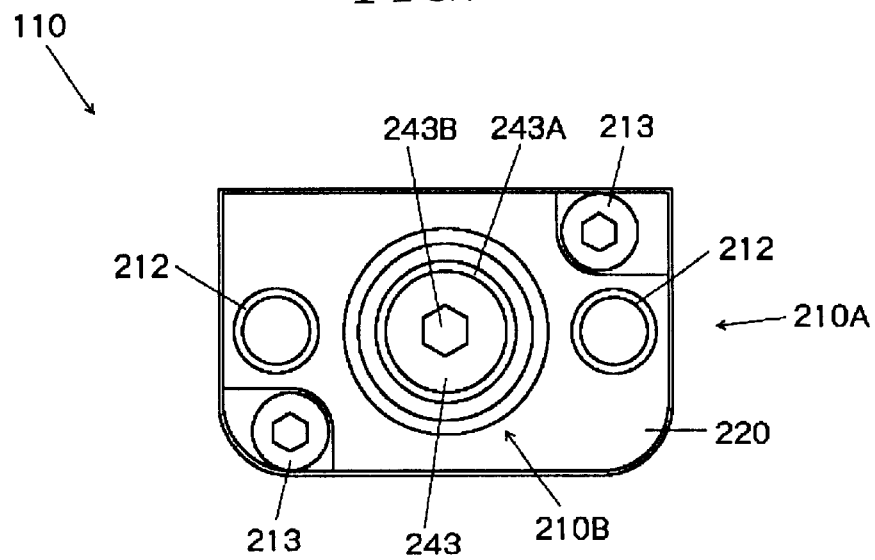
FIG. 20 is a bottom view of a sixth embodiment.

It is preferable that the lower part 210B of the base body has a cylindrical shape as has been made clear in FIG. 20. Since, by making the shape cylindrical, machining thereof can be facilitated and the lower part 210B can be made small with the strength thereof maintained, a decrease in production costs can be achieved. Further, since incorporation thereof into a mold can be facilitated, not only can a decrease in production costs of an in-mold gate opening and closing apparatus itself be achieved, but also production costs of the whole mold can be reduced.

In addition, the basic structure of the upper part 210A of the base body is almost the same as that of the upper part 110A of the base body in the third and fourth embodiments as an in-mold gate opening and closing apparatus such as a gate void 111 and a guide groove 112, etc., excepting that detailed structures thereof are changed from those in the third and fourth embodiments. In FIGS. 19 through 23, 220 denotes an upper part bottom plate of the base body that is used to attach the lower part 210B of the base body to the upper part 210A of the base body. In FIG. 20, 212 denotes an attaching hole into which a fixing means such as a bolt to fix a unit in a mold is inserted, and 213 denotes a fixing means to attach the upper part bottom plate 220 of the base body to the upper part thereof.

The sixth embodiment is provided with a new feature of adjusting a movement stroke in addition to the feature of spring pressure adjustment in the third and fourth embodiments while reducing the major components by one. By removing one of the major components, the entire construction thereof can be simplified, a further greater decrease can be achieved in production costs than a decrease in production costs resulting from reduction in the number of parts, and furthermore, a secondary effect can be brought about, which is a downsizing of the apparatus.

A further detailed description is given of the sixth embodiment. Although the gate pin 120 is attached to and fixed at the moving cylinder 132 by a gate pin fixing member 121 in the third and fourth embodiments, the gate pin is attached to and fixed at the upper construction 240B of the center shaft 240 by a gate pin fixing member 121 in the sixth embodiment, and at the same time, the corresponding center shaft 240 is caused to move in the axial direction. And, although, in the third and fourth embodiments, the spring 131 is accommodated around the center shaft 140 and in the moving cylinder 132, in the sixth embodiment, the spring is directly accommodated in the lower part 210B of the base body around the center shaft 240, whereby the moving cylinder 132 can be omitted. By omitting the moving cylinder 132, the entire construction can be simplified and made small-sized as described above, resulting in a decrease in production costs.

The spring 131 can be adjusted by rotating the adjusting member 243 fitted to the inner lower side of the lower part 210B of the base body in a screwed-in state downward of the center shaft 240. In the drawing, 243A denotes a threaded portion.

The adjusting member 243 is rotated by inserting a hexagonal wrench into the bottom part of the lower part 210B of the base body, that is, a hexagonal hole 243B drilled at the center part on the bottom surface shown in FIG. 20. By rotating the adjusting member 243, the adjusting member 243 moves in the axial direction of the center shaft 240 while rotating. By movement of the adjusting member 243, the strength of the pressing force of the spring 131 can be adjusted.

Also, the sixth embodiment employs a construction in which the adjusting member 243 is turned by the hexagonal wrench. However, the present invention is not limited to this construction. Any construction may be employed if it is carried out from the bottom part at the lower part 210B of the base body. That is, other constructions that have been publicly known and used, for example, a plus-shaped thread and a minus-shaped thread may be employed instead of a hexagonal hole 243B, or a gripping member is attached to the bottom part of the adjusting member 243 directly or indirectly, and the same may be turned by hand without use of any tool.

The adjusting member 243 not only functions as a spring receiver of the spring 131 and adjusts the pressing force thereof but also is provided with a feature for adjusting the amount of movement of escape actions of the gate pin 120. That is, it is possible to limit the maximum moving position of the center shaft 240 by a stopper plane 243C that is provided on the inner side of the adjusting member 243.

Figure 21:
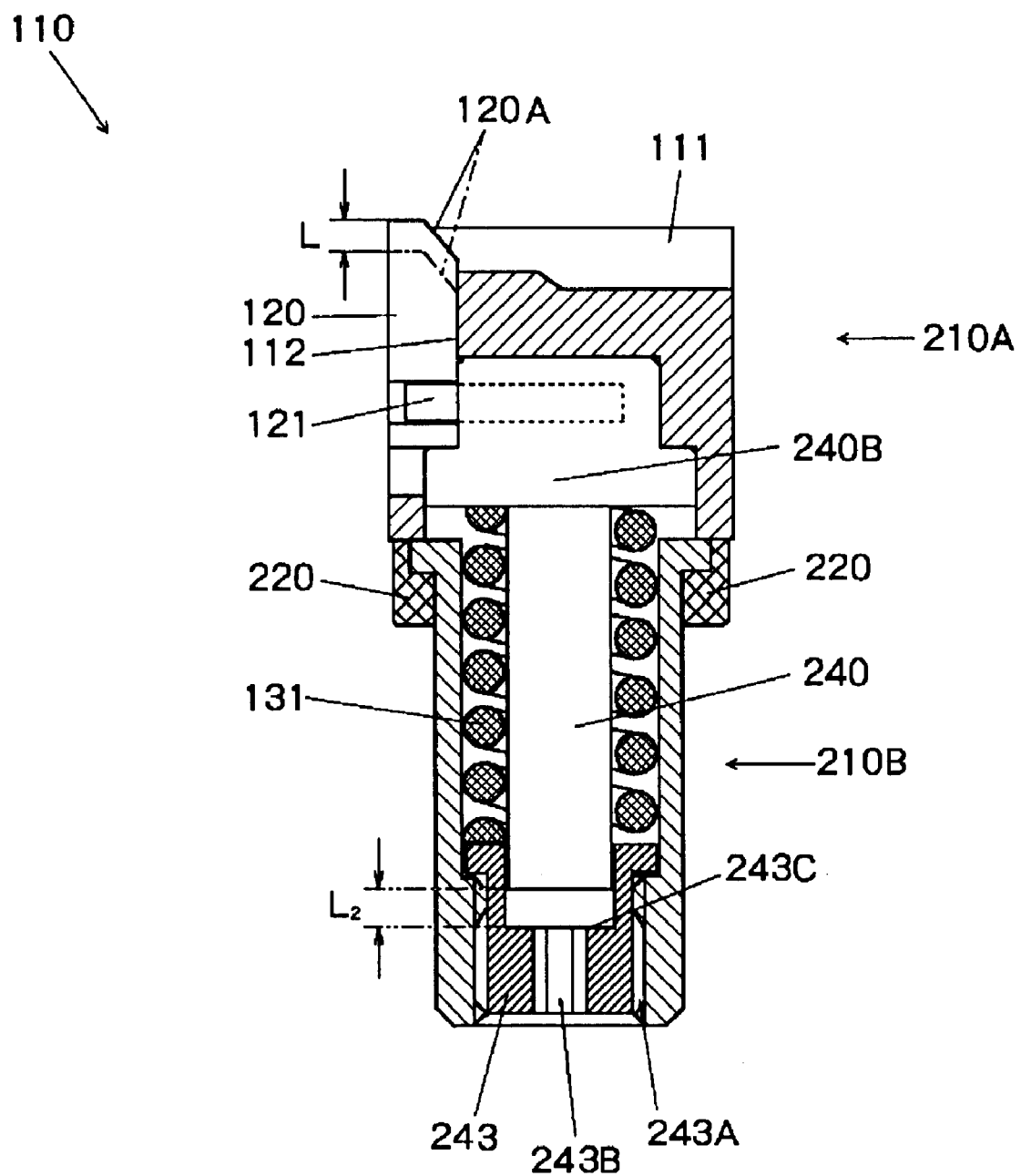
FIG. 21 is a sectional view taken along the line XXI—XXI in FIG. 19.

In a state shown in FIG. 21, since the adjusting member 243 is positioned at the extremely lower position, that is, the stopper plane 243C is positioned at the extremely far position from the lower end of the center shaft 242, a relationship between the stroke L of the gate pin 120 and a movement tolerance $L_2$ of the center shaft 240 is $L \leq L_2$. Accordingly, there is no limitation with respect to the movement stroke L of the center shaft 240 and gate pin 120, wherein the gate can be fully opened.

Figure 22:
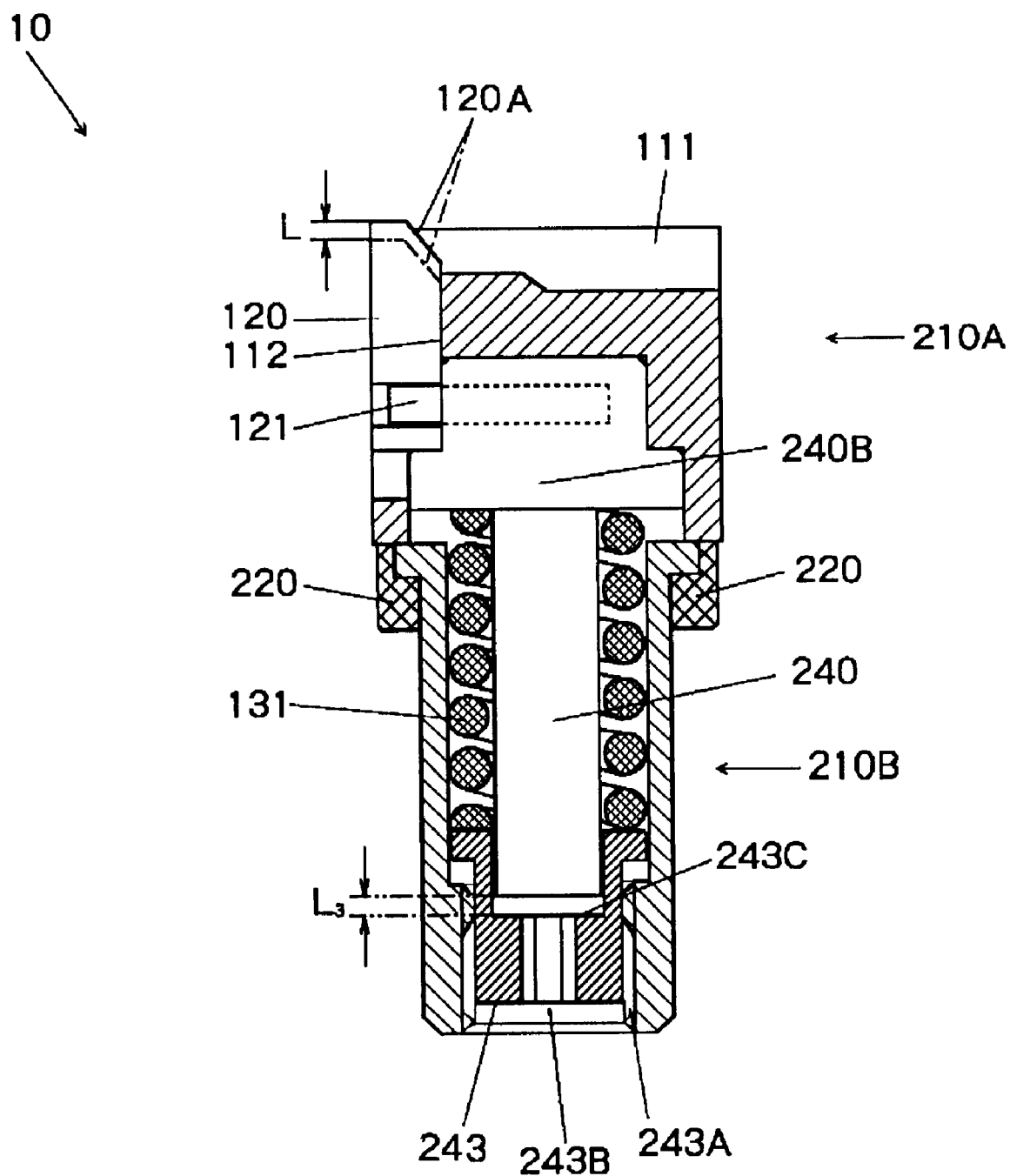
FIG. 22 is a sectional view showing another state in FIG. 21.

To the contrary, if, by rotating the adjusting member 243, the pressing force of the spring 131 is increased and the stopper plane 243C is raised as shown in FIG. 22, $L=L_3$ is established if the movement tolerance $L_2$ of the center shaft 240 is set to approximately half the movement tolerance $L_2$ in FIG. 21. Therefore, the movement stroke L of the gate pin 120 can be limited to approximately half, wherein the gate is not fully opened but is limited to a semi-open state.

Figure 23:
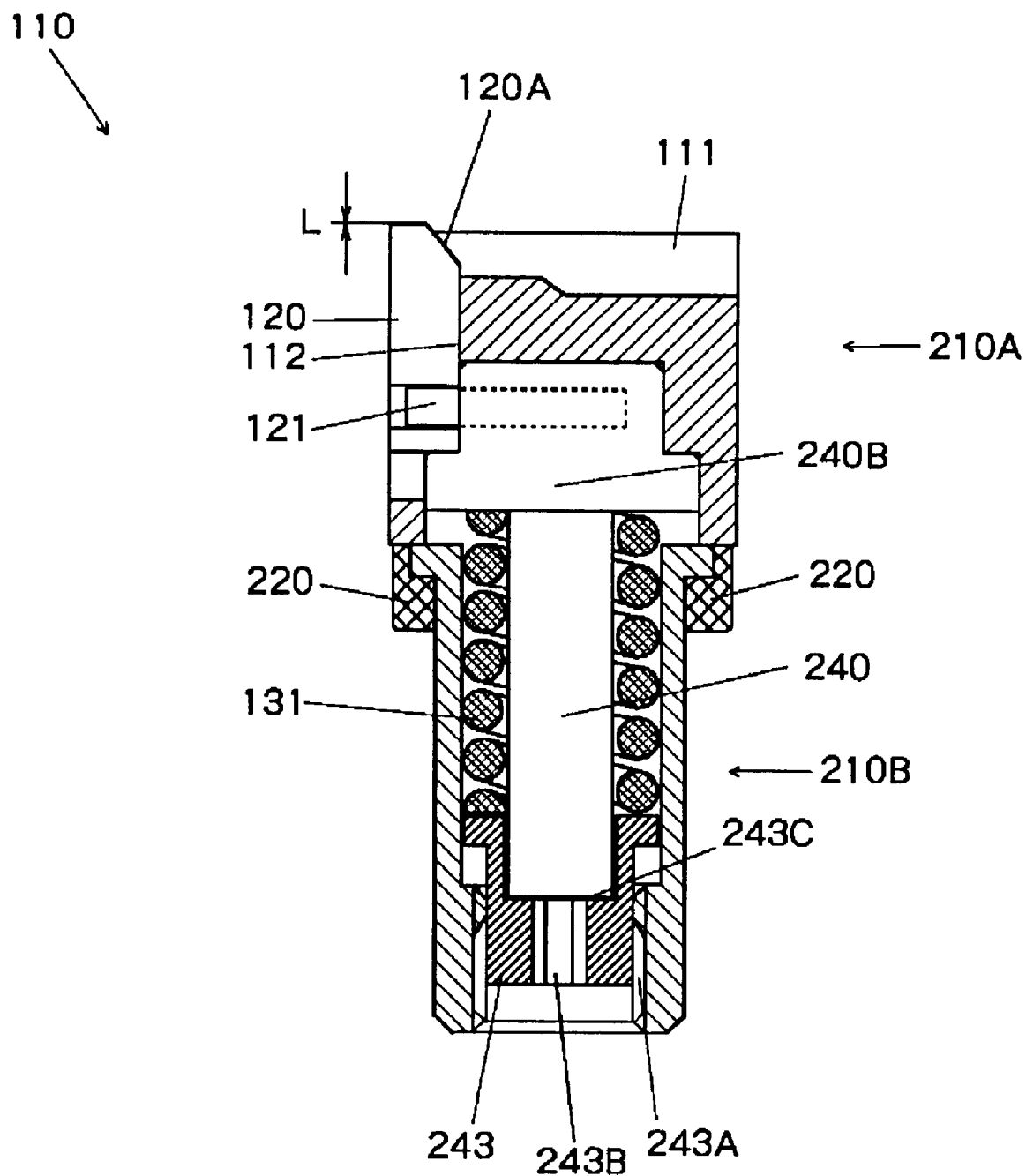
FIG. 23 is a sectional view showing still another state in FIG. 21.
Figure 24:
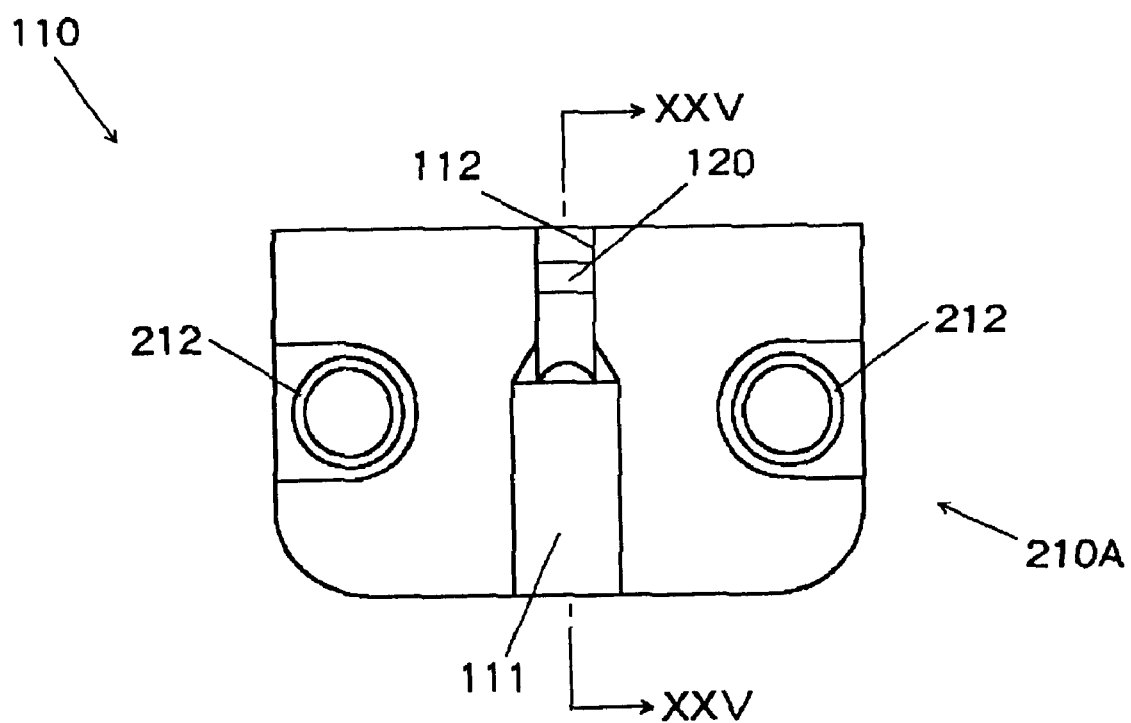
FIG. 24 is a plan view showing a seventh embodiment of an in-mold gate opening and closing apparatus according to the present invention.

If, by rotating the adjusting member 243, the stopper plane 243C is raised until the same is brought into contact with the lower end of the center shaft 240, which is the extremely upper position of the stopper plane 243C, as shown in FIG. 23, the center shaft 240 is fixed so as not to move, wherein the movement stroke L of the gate pin 120 is made zero (that is, L=0), and the gate is always closed.

As has been described on the basis of FIGS. 19 through 23, by moving the adjusting member 243 in the axial direction of the center shaft 240, it is possible to adjust the movement stroke L of the gate pin 120 step-free from full opening of the gate to full closing thereof.

Accordingly, gate balance of multiple gates can be sufficiently secured by only adjusting the pressing force of the spring and the movement stroke of the gate pin, wherein it is easy to adjust the gate balance. In particular, according to the present embodiment, not only can adjustment of the gate balance be facilitated even in a case of set-by-set molding in which weight ratios are remarkably different from each other, but also it is possible to close or shut off only unnecessary gates where gates are required in only some products in a mold for producing a plurality of products.

Next, a description is given of the seventh embodiment of an in-mold gate opening and closing apparatus according to the invention with reference to FIG. 24 through FIG. 27. Also, in FIGS. 24 through 27, parts that are the same as those in the third and fourth embodiments shown in FIGS. 5 through 14 are given the same reference numbers while parts that are different from those in the former two embodiments are given different reference numbers.

The seventh embodiment is provided with a construction for adjusting the amount of movement (movement stroke) of escape actions of the gate pin 120 in addition to adjusting the pressing force of the spring 131 with respect to the gate pin 120 as in the sixth embodiment described above. The range of adjusting the amount of movement of escape actions can be adjusted step-free from full opening of a gate to full closing thereof as in the fifth embodiment.

A different point between the sixth embodiment and the seventh embodiment resides in that, although in the six embodiment the lower part 210B of the base body is attached to and fixed at the upper part 210A of the base body by the upper part bottom plate 220 of the base body, and at the same time, the adjusting member 243 is caused to move in the axial direction by rotating only the adjusting member 243 with respect to adjustment of the movement stroke and the spring pressure, in the seventh embodiment, the lower part 210B of the base body is idly attached to the upper part 210A of the base body movably in the direction of rotation by the upper part bottom plate 320 of the base body with respect to the upper part 210A of the base body, and at the same time, the adjusting member 342 that is screwed in the threaded portion 342A at the lower portion 210B of the base body is caused to move only in the axial direction without rotating by rotating only the lower part 210B of the base body.

An idly fitting groove 342B is provided at the adjusting member 342. By idly inserting a fixing member 343, which is attached to the center shaft 340, into the idly fitting groove 342B movably in only the axial direction, rotation in the rotating direction can be regulated. Therefore, if the lower part 210B of the base body is rotated, the adjusting member 342 is caused to move in the axial direction. By movement of the adjusting member 342, the pressing force of the spring 131 can be adjusted. Also, in the seventh embodiment, the gate pin 120 is attached to the upper construction 340A of the center shaft 340 by the gate pin fixing member 121.

The adjusting member 342 may be rotated by directly gripping the lower part 210B of the base body and manually turning the same or turning the same with a tool such as pliers.

The adjusting member 342 not only functions as a spring receiver of the spring 131 and adjusts the pressing force thereof as described above, but also is provided with an adjusting feature of the amount of movement of escape actions of the gate pin 120. That is, it is possible to limit the maximum moving position of the center shaft 340 by a stopper plane 342C that is provided at the upper part of the adjusting member 342.

Figure 25:
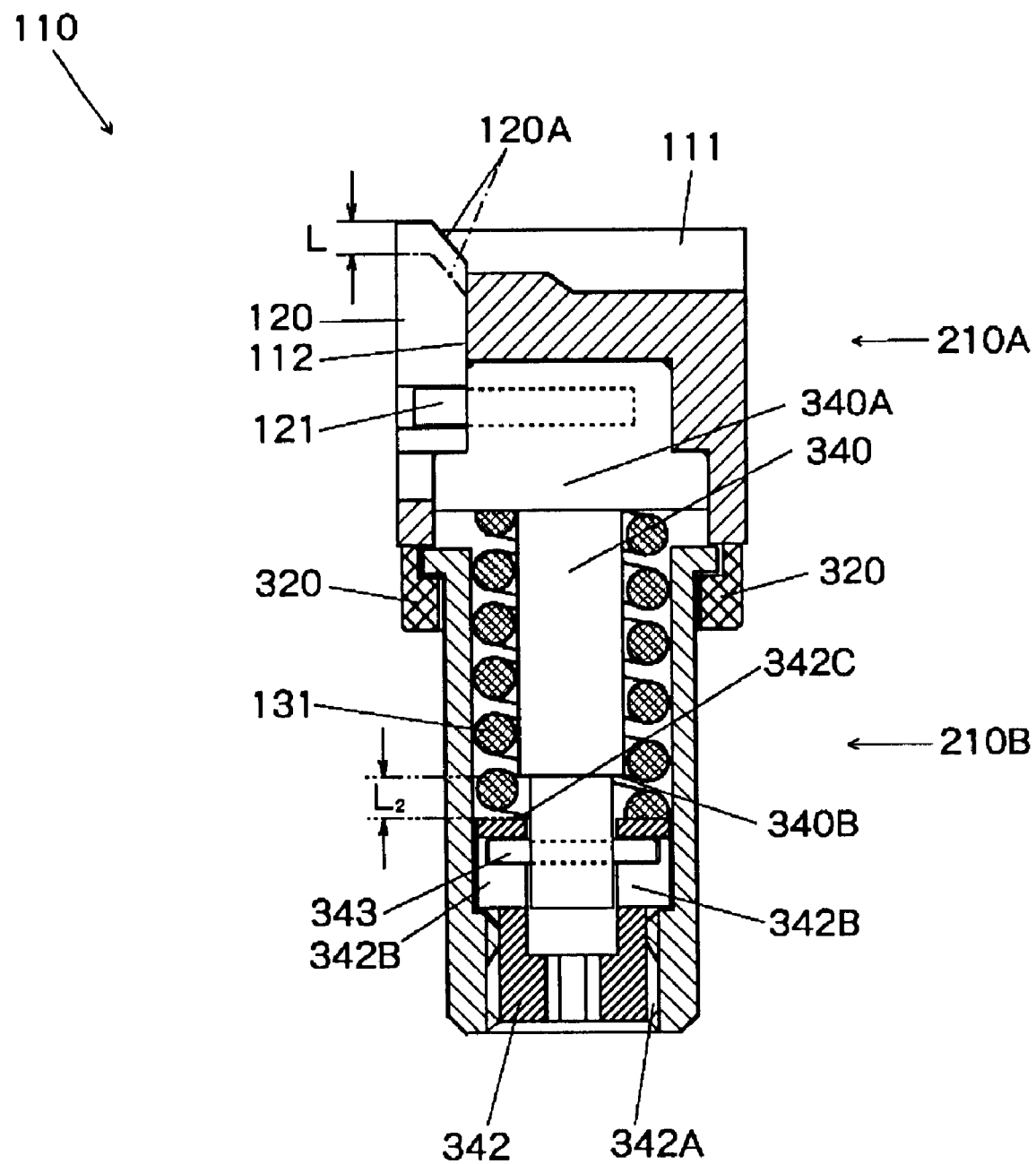
FIG. 25 is a sectional view taken along the line XXV—XXV in FIG. 24.

In a state shown in FIG. 25, since the adjusting member 342 is positioned at the extremely lower position, that is, the stopper plane 342C is located at a position farther from the stopper portion 340B of the center shaft 340, a relationship between the stroke L of the gate pin 120 and a movement tolerance $L_2$ of the center shaft 340 is $L \leq L_2$. Accordingly, there is no limitation with respect to the movement stroke L of the center shaft 340 and gate pin 120, wherein the gate can be fully opened.

Figure 26:
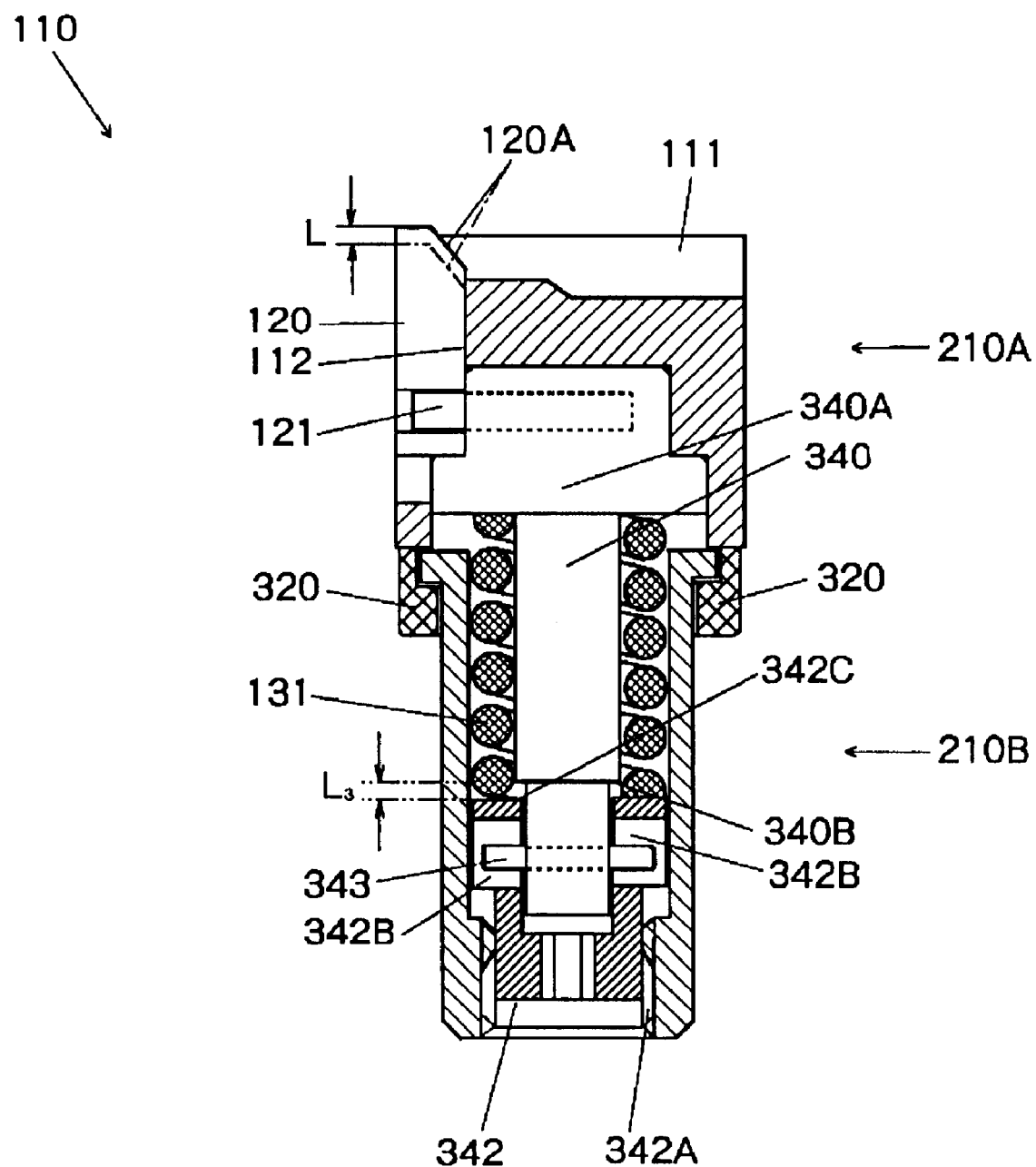
FIG. 26 is sectional view showing another state in FIG. 25.
Figure 27:
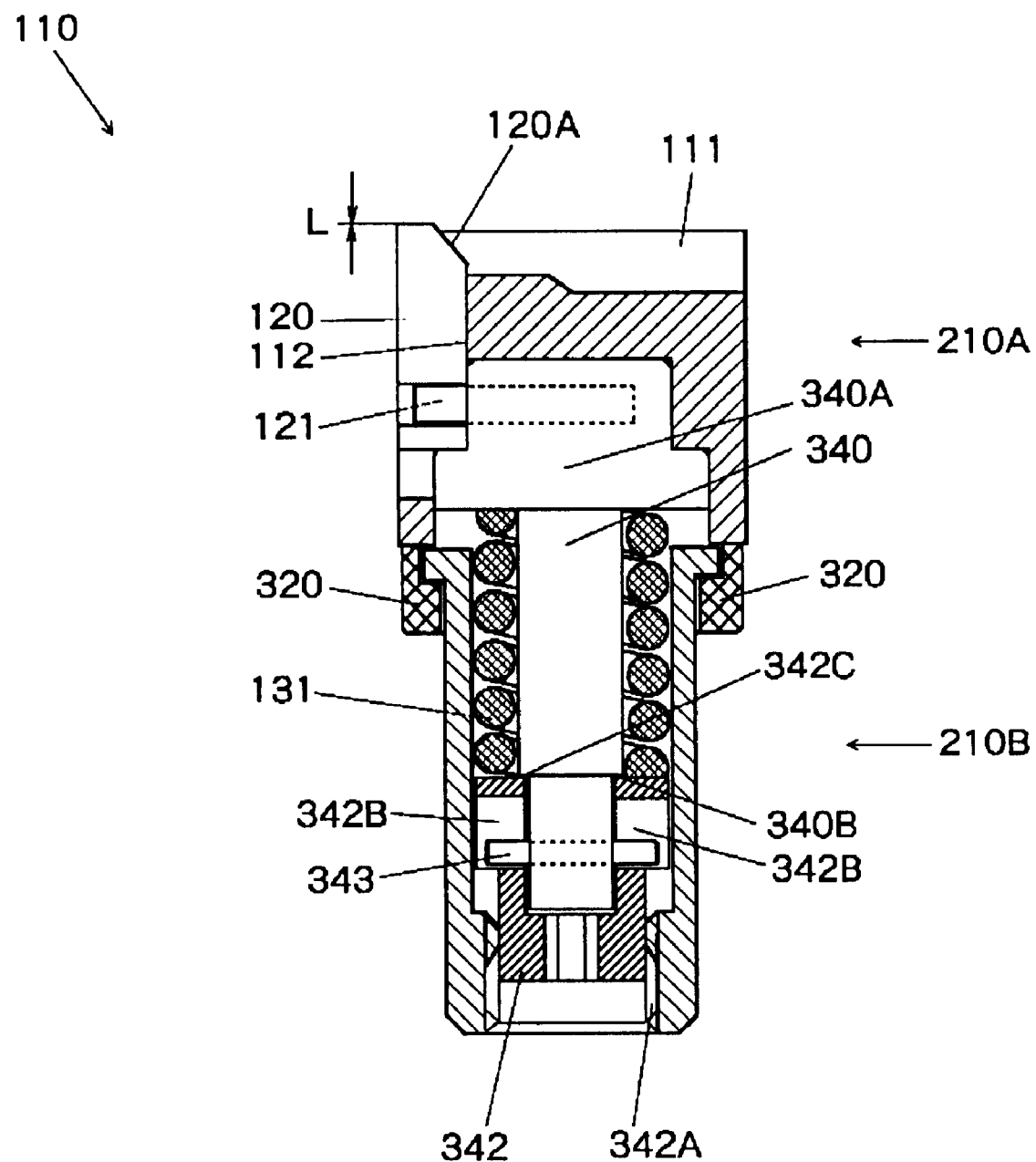
FIG. 27 is sectional view showing still another state in FIG. 25.

To the contrary, the adjusting member 342 is moved in the axial direction by rotating the lower part 210B of the base body to strengthen the pressing force of the spring 131, and the stopper plane 342C is raised as shown in FIG. 26, wherein since $L=L_3$ is established if the movement tolerance $L_3$ of the center shaft 340 is approximately half the movement tolerance $L_2$, the movement stroke L of the gate pin 120 is limited to approximately half, and the gate is not fully opened but is limited to a semi-open state.

Still further, the adjusting member 342 is moved by rotating the lower part 210B of the base body, the stopper plane 342C is raised, as shown in FIG. 23, until the same is brought into contact with the stopper portion 340B of the center shaft 340, which is the extremely upper limit position, and the center shaft 340 is fixed to be non-movable, whereby the movement stroke of the gate pin 120 becomes zero (L=0), and the gate is always closed.

As has been described on the basis of FIGS. 24 through 27, by moving the adjusting member 342 in the axial direction of the center shaft 340, the seventh embodiment is capable of adjusting the movement stroke L of the gate pin 120 step-free from full opening of a gate to full closing thereof as in the sixth embodiment. Therefore, effects that are similar to those in the sixth embodiment can be brought about.

As described above, the seventh embodiment was explained. However, in the above embodiment, it is necessary to carry out adjustment of the spring pressure and movement stroke after being detached from a mold. However, the embodiment may be constructed so that the adjustment is enabled in a state where the unit is incorporated in a mold with detaching the same therefrom. Such a construction is described as an eighth embodiment with reference to FIG. 28 and FIG. 29.

Figure 28:
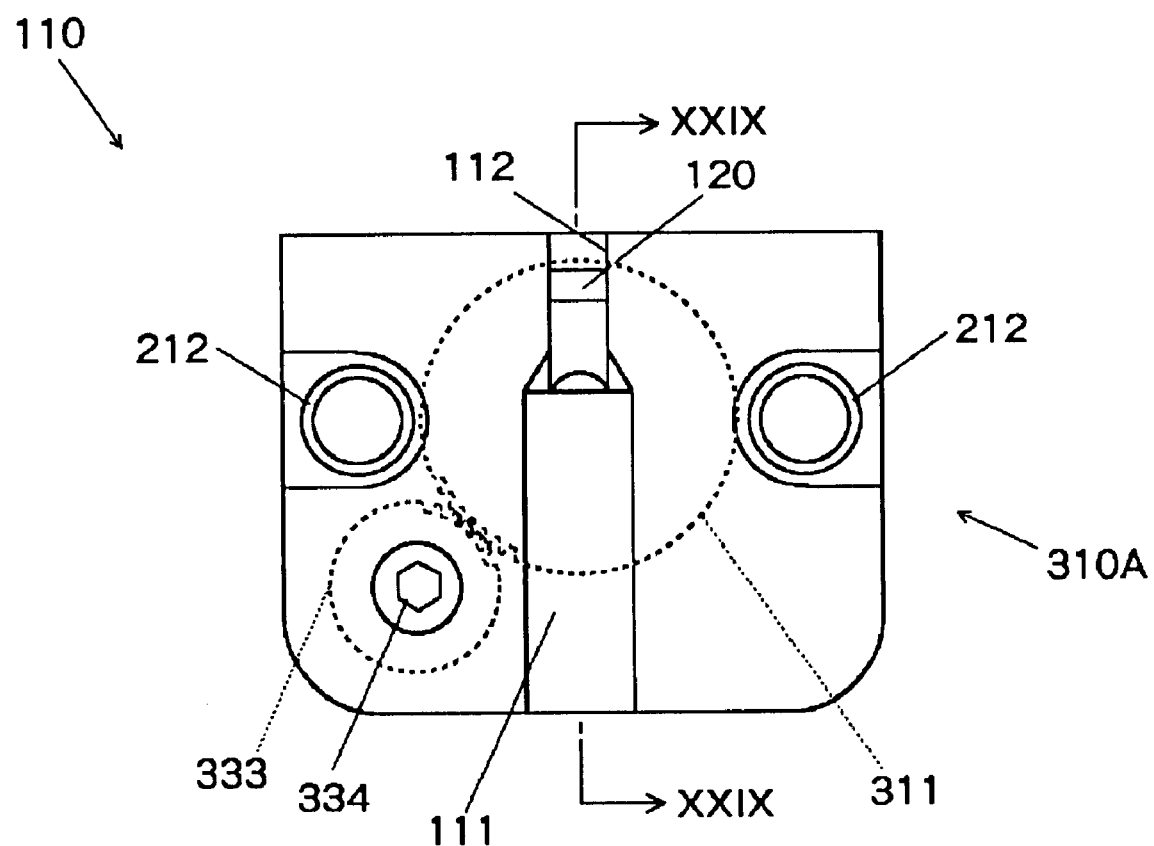
FIG. 28 is a plan view showing an eighth embodiment of an in-mold gate opening and closing apparatus according to the present invention.
Figure 29:
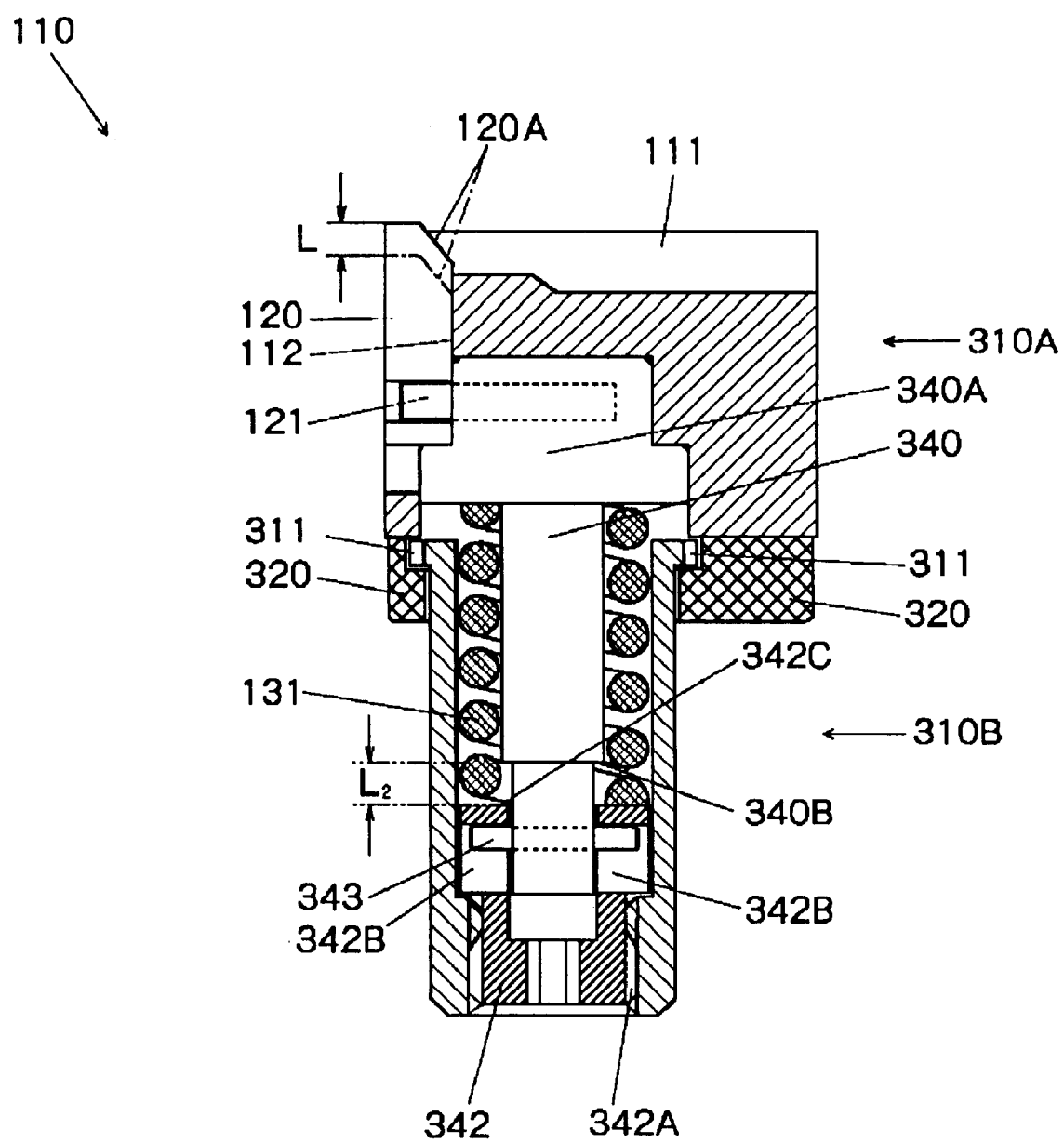
FIG. 29 is a sectional view taken along the line XXIX—XXIX in FIG. 28.

As shown in FIG. 29, the upper end portion 311 at the lower part 310B of the base body, which is idly attached to the upper part 310A of the base body by the upper part bottom plate 320 of the base body is formed to be like a gear, a gear mechanism 333 that is engaged with the corresponding gear-like upper end portion 311 is provided in the upper part 310A of the base body by a hypothetical line in FIG. 28, and an adjusting nut 334 of the gear mechanism 333 is provided on the upper surface at the upper part 310A of the base body.

By rotating the adjusting nut 334 secured on the upper surface of the upper part 310A of the base body, the gear-like upper end portion 311 that is engaged with the corresponding gear mechanism 333 is also rotated via the gear mechanism 333. The adjusting member 342 moves in the axial direction by rotations of the upper end portion 311. The spring pressure and movement stroke are adjusted by movement of the adjusting member 342. Detailed adjustment of the spring pressure and movement stroke is the same as in the seventh embodiment described above.

Descriptions were given of the sixth embodiment through the eighth embodiment of an in-mold gate opening and closing apparatus according to the invention. However, these embodiments are applicable not only to a mode in which a construction for adjusting the amount of movement of escape actions of the gate pin 120 is added to a construction for adjusting the pressing force of a spring 131 with respect to the gate pin 120 in the third and fourth embodiments described above, but also to a mode in which the construction is added to a mode where no flange portion 113 is provided as in the first and second embodiment described above.

The following effects can be brought about by an in-mold gate opening and closing mechanism and a mold according to the invention, wherein the above-described objects can be solved and achieved.
(1) Simple structure can be achieved by utilizing resin pressure, wherein no external power such as pneumatic and/or hydraulic pressure is required.
(2) If a mold is of a side gate specification, the above-described mechanism can be incorporated in not only a cold runner mold but also a hot runner mold.
(3) The gate balance of multiple gates can be sufficiently adjusted by only adjusting the pressing force of the spring, and the gate balance can be easily adjusted. According to preferred embodiments of the invention, since the spring pressure can be adjusted without disassembling a mold, adjustment thereof can be performed while molding. Further, a weld line can be simply moved. Injection timing can be secured with a hot runner not having any valve gate. Also, it is easily possible to mold, set by set, products, whose weight ratios are remarkably different from each other. Furthermore, since the gate balance can be adjusted, dimensions such as a manifold block runner diameter, and a nozzle gate diameter, etc., can be made identical to each other in a hot runner mold, wherein fluidity analysis can be easily examined. Also, with resin whose viscosity is high and fluidity is worsened, adjustment of gates with respect to respective cavities requires a cutting tool when attempting to make an adjustment. However, no tool is required in the units according to the invention.
(4) Since it is possible to adjust the gate balance when molding products set by set, it is easily possible to mold, set by set, products whose weight ratios are remarkably different from each other.
(5) Since the gate is closed when the holding pressure is OFF or is reduced to an appointed level or less, an aesthetic cutting surface can be obtained. Also, in the case of transparent resin such as PMMA (acryl), the cutting surface can be kept free from any whitening or cracking, and the cut surface can be kept transparent.
(6) Automation can be achieved.
(7) Others, including no equipment necessary for an extraction apparatus. Since the gate is closed when the holding pressure is OFF or is reduced to an appointed level or less, resin can be prevented from inverted flows from cavities, and it is possible to mark the name of resin in the vicinity of the gate. This is effective for recycling.
(8) According to the invention as set forth in claim 12, since a flange portion having an upper surface portion that is flush with the upper surface portion of a mold where the unit is incorporated is attached to the upper part of the base body, incorporation of the unit can be facilitated.
(9) In particular, according to the present invention, it is a matter of course that effects (1) through (8) can be brought about. Still further, it is possible to close or shut off only unnecessary gates where gates are required in only some products in a mold for producing a plurality of products. Therefore, unnecessary product molding can be eliminated.
(10) In particular, according to the present invention, the gate balance of multiple gates can be sufficiently adjusted by only adjusting the pressing force of the spring and the movement stroke of the gate pin. The gate balance can be easily adjusted. The spring pressure and movement stroke can be adjusted without disassembling a mold, and adjustment thereof can be performed while molding. Further, a weld line can be simply moved. Injection timing can be secured with a hot runner not having any valve gate. Also, it is easily possible to mold, set by set, products, whose weight ratios are remarkably different from each other. Furthermore, since the gate balance can be adjusted, dimensions such as a manifold block runner diameter, and a nozzle gate diameter, etc., can be made identical to each other in a hot runner mold, wherein fluidity analysis can be easily examined. Also, with resin whose viscosity is high and fluidity is worsened, adjustment of gates with respect to respective cavities needs a cutting tool when attempting to make an adjustment. However, no tool is required in the units according to the invention.

(11) According to claims 6 through 10, since the entire structure can be simplified, machining can be facilitated. The entire construction can be made small-sized while maintaining strength, resulting in a decrease in production costs. Further, incorporation of the unit in a mold can be facilitated. Not only can a decrease in costs regarding a single in-mold gate opening and closing apparatus be achieved but also a decrease in the entire costs of a mold is possible.

What is claimed is:

1. An in-mold gate opening and closing mechanism, comprising, in one unit:
    a base body formed of a metallic block, said base body having a surface and an inner space;
    a runner gate opened and closed from a direction orthogonal to or a direction the same as a gate direction;
    a gate void formed at an upper end portion of the base body;
    a gate pin disposed in a guide groove extending continuously from said gate void;
    a columnar space at a lower part of said gate void inside said base body;
    a spring inside a moving cylinder inserted into said columnar space, a lower end of said gate pin being engaged with and fixed at a rear end of said moving cylinder, said gate pin always being pressed in a direction of said gate void by a force of said spring; and
    a spring pressure adjusting nut pressing a rear end of said spring provided in a screwed-in state to turn clockwise and counterclockwise at an open end side of said moving cylinder of said base body, whereby a pressing force acting on said gate pin can be increased by turning said spring pressure adjusting nut in a direction of contraction of said spring, said pressing force acting on said gate pin being decreased by turning said adjusting nut in a reverse direction.

2. An in-mold gate opening and closing mechanism, comprising in one unit:
    the base body formed of a metallic block, said base body having a surface and an inner space;
    a runner gate opened and closed from a direction orthogonal to or a direction the same as a direction of said gate;
    a gate void formed at an upper end portion of a base body;
    a gate pin disposed in a guide groove extending continuously from said gate void;
    a columnar space at a lower part of said gate void inside said base body;
    a moving cylinder inserted into said columnar space;
    a center shaft, inserted into a spring, and accommodated in said moving cylinder, a lower end of said gate pin being engaged with and fixed at a rear end of said moving cylinder such that said gate pin is always pressed in a direction of said gate void by a force of said spring, said center shaft being provided between a bearing hole at a tip end side of said base body and a bearing member pressing a rear end of said spring and fixed in a columnar hole at a rear end side of said base body, said moving cylinder and said spring being disposed at said center shaft; and
    a stop bushing and a worm wheel disposed at said center shaft, with said worm wheel engaged with a rotatable worm, such that as said worm is rotated, said worm wheel interlocked with said worm is rotated and a pressing force of said spring is adjusted by said center shaft moving in a direction of tightening said spring by clockwise rotation by engagement with a bearing member by a screw mechanism or moving in a direction of opening said spring by counterclockwise rotation.

3. An in-mold gate opening and closing mechanism, comprising in one unit:
    a flange portion having an upper surface portion, flush with an upper surface portion of a metal mold and provided on an upper part of a base body formed of a metallic block, having component elements thereof on an upper part surface of said base body and in an inner space at a lower part thereof;
    a runner gate opened and closed in a direction orthogonal to a gate direction or in a direction the same as the gate direction;
    a gate void formed at an end portion on the upper surface of the base body;
    a gate pin disposed in a guide groove extending continuously from said gate void;
    a columnar space provided at a lower part of said gate void inside said base body;
    a moving cylinder inserted into said columnar space;
    a center shaft is inserted into a spring and accommodated in said moving cylinder, a lower end of said gate pin being engaged with and fixed at a rear end of said moving cylinder, such that said gate pin is always pressed in a direction of said gate void by a force of said spring;
    said center shaft being provided with a gear with said center shaft being a rotation axis thereof, at an upper part thereof, a spring receiver nut pressing a rear end of said spring and provided in a screwed-in state so as not to rotate at a portion where the corresponding center shaft is positioned downward toward said columnar space, a lower end of said center shaft being pivotally supported in a bearing hole at the bottom of said base body;
    a spring pressure adjusting nut being provided at an upper surface side of said base body so that said adjusting nut can turn clockwise and counterclockwise; and
    a gear provided at a lower part of said spring pressure adjusting nut being rotatable along with rotation operation of said spring pressure adjusting nut, said center shaft rotating by rotation of said gear with said center shaft being engaged with said gear such that said center shaft is made into an axis, said spring receiving nut being provided so as not to rotate in accordance with rotation of said center shaft and being moved in an axial direction of said center shaft, such that pressing force of said spring is adjusted.

4. An in-mold gate opening and closing mechanism, comprising in one unit:
- a flange portion having an upper surface portion flush with an upper surface portion of a metal mold and provided on an upper part of a base body formed of a metallic block, having component elements thereof on the upper part surface of said base body and in an inner space at a lower part thereof;
- a runner gate is opened and closed in a direction orthogonal to a gate direction or in a direction the same as the gate direction;
- a gate void formed at an end portion on the upper surface of the base body;
- a gate pin disposed in a guide groove extending continuously from said gate void;
- a columnar space provided at a lower part of said gate void inside said base body;
- a moving cylinder inserted into said columnar space;
- a center shaft inserted into the spring and accommodated in said corresponding moving cylinder, a lower end of said gate pin being engaged with and fixed at a rear end of said moving cylinder, such that said gate pin is always pressed in a direction of said gate void by a force of said spring;
- a spring receiving nut pressing a rear end of said spring being provided at a portion of said center shaft positioned downward toward said columnar space, a lower end of said center shaft being pivotally supported in a bearing hole at a bottom portion of said base body; and
- said center shaft being rotated at a bearing shaft that is a hole drilled at a lower part of said base body, said spring receiving nut being movable such that a pressing force of the spring is adjustable.

5. An in-mold gate opening and closing mechanism comprising in one unit:
- a base body formed of a metallic block, said base body having an upper surface, and an inner space at the lower part thereof;
- a runner gate opened and closed in a direction orthogonal to a gate direction or in the same direction as the gate direction;
- a gate void formed at an end portion on the upper surface of the base body;
- a gate pin disposed in a guide groove extending continuously from said gate void;
- a columnar space provided at a lower part of said gate void inside said base body;
- a moving cylinder inserted into said columnar space;
- a center shaft inserted into a the spring and accommodated in said moving cylinder, a lower end of said gate pin being engaged with and fixed at a rear end of said moving cylinder, such that said gate pin is always pressed in a direction of said gate void by a force of said spring;
- said center shaft being provided with a gear with said center shaft forming a rotation axis at an upper part thereof, a downward tip end of said center shaft being inserted into a through-hole portion of an adjusting member, said adjusting member pressing a the rear end of said spring slidably in an axial direction said adjusting member being is attached to a lower part of said base body in a screwed-in state;
- a stopper portion adjusting an amount of movement with respect to an escape action of said gate pin by limiting a maximum moving position by being brought into contact with a lower end of said moving cylinder at an outer circumference of said adjusting member; and
- a spring pressure adjusting nut on the upper surface side of the said base body so that said spring pressure adjusting nut can rotate clockwise and counterclockwise, a gear at the lower part of said spring pressure adjusting nut, rotating along with rotation operations of said spring pressure adjusting nut, said center shaft rotating by rotation of said gear with said center shaft engaged with the said gear and made into an axis, said adjusting member being movable in the axial direction by rotations together with said center shaft by rotations of said center shaft, such that pressing force of said spring is adjusted.

6. An in-mold gate opening and closing mechanism comprising in one unit:
- a base body formed of a metallic block and, said base body having an upper surface, an upper part and an inner space at a lower part thereof;
- a runner gate opened and closed in a direction orthogonal to a gate direction or in the same direction as the gate direction;
- a gate void formed at an end portion on an upper surface of said base body;
- a gate pin disposed in a guide groove extending continuously from said gate void;
- a columnar space provided at a lower part of said gate void inside said base body;
- a moving cylinder inserted into said columnar space;
- a center shaft, inserted into a spring and accommodated in said moving cylinder, a lower end of said gate pin being engaged with and fixed at a rear end of said moving cylinder such that said gate pin is always pressed in a direction of said gate void by a force of said spring;
- a downward tip end portion of said center shaft being inserted into a through-hole portion of an adjusting member pressing a rear end of said spring and being slidable in an axial direction, simultaneously the adjusting member being attached to the lower part of said base body in a screwed-in state;
- a stopper portion adjusting an amount of movement relative to an escape action of said gate pin by limiting a maximum moving position by being brought into contact with a lower end of said moving cylinder at the outer circumference of said adjusting member; and
- said center shaft being rotatable at said bearing hole portion which is a hole drilled at the lower part of said base body, and said adjusting member being movable in an axial direction to adjust pressing force of said spring.

7. An in-mold gate opening and closing mechanism comprising in one unit:
- a base body formed of a metallic block, said base body having an upper surface, an upper part and an inner space at a lower part thereof;
- a runner gate opened and closed in a direction orthogonal to a gate direction or in the same direction as the gate direction;
- a gate void formed at an end portion on the upper surface of said base body;
- a gate pin disposed in a guide groove extending continuously from said gate void;

a columnar space provided at a lower part of said gate void inside said base body;

a center shaft inserted into a spring and accommodated in said columnar space, a lower end of said gate pin being engaged with and fixed at an upper part of the center shaft such that said gate pin is always pressed in a direction of said gate void by a force of said spring;

an adjusting member pressing a rear end of said spring and fitted to a lower part of said center shaft, and at the same time, to a downward inner side at the lower part of said base body in a screwed-in state, said adjusting member being rotatable relative to a bottom part of said base body, said adjusting member being movable in an axial direction of said center shaft while rotating such that pressing force of said spring is adjusted; and a stopper plane adjusting an amount of movement with respect to an escape action of said gate pin by limiting a maximum moving position by being brought into contact with a lower end of said center shaft is provided inside said adjusting member.

8. An in-mold gate opening and closing mechanism, comprising:

a lower part of a base body formed of a metallic block movable in a direction of rotation with respect to an upper part of the base body component elements forming one unit, said unit:

incorporated on an upper surface of the base body and in an inner space at a lower part of said base body;

a runner gate opened and closed in a direction orthogonal to the gate direction or in the same direction as the gate direction;

a gate void formed at an end portion on the upper surface of said base body;

a gate pin disposed in a guide groove extending continuously from the gate void;

a columnar space provided at a lower part of said gate void inside said base body;

a center shaft inserted into a spring and accommodated in said columnar space, a lower end of said gate pin being engaged with and fixed at an upper part of said center shaft, such that said gate pin is always pressed in a direction of the gate void by a force of said spring;

an adjusting member pressing a rear end of said spring fitted to a lower part of said center shaft, and at the same time, to a downward inner side at the lower part of said base body in a screwed-in state, said adjusting member being rotatable relative to the lower part of said base body, said adjusting member moving in only an axial direction without rotating, such that pressing force of the spring is adjusted; and a stopper plane adjusting an amount of movement with respect to an escape action of said gate pin by limiting a maximum moving position by being brought into contact with a lower end of said center shaft provided at an inner side portion of said adjusting member.

9. An in-mold gate opening and closing mechanism comprising:

a lower part of a base body formed of a metallic block movable in a direction of rotation with respect to an upper part of said base body component elements forming one unit, said unit positioned on an upper surface of an upper part of said base body and in inner space of said base body, said inner space positioned at a lower part of said base body;

a runner gate opened and closed in a direction orthogonal to a gate direction or in a same direction as the gate direction;

a gate void formed at an end portion on the upper surface of the base body;

a gate pin disposed in a guide groove extending continuously from said gate void;

a columnar space provided at a lower part of said gate void inside said base body;

a center shaft inserted into the spring and accommodated in said columnar space, a lower end of said gate pin being engaged with and fixed at an upper part of said center shaft, such that said gate pin is always pressed in a direction of the gate void by a force of said spring;

an upper end portion at the lower part of said base body having a gear, a gear mechanism being engaged with said gear at said upper end portion and provided in the upper part of said base body;

an adjusting nut of said gear mechanism provided on the upper surface at the upper part of said base body;

an adjusting member fitted downward of said center shaft, and at the same time, to a downward inner side at the lower part of said base body in a screwed-in state, the lower part of said base body being rotatable by rotation operations of said adjusting nut, said adjusting member being movable in only an axial direction without rotating, such that pressing force of the spring is adjusted; and a stopper plane adjusting an amount of movement with respect to an escape action of said gate pin by limiting a maximum moving position by being brought into contact with a lower end of the center shaft provided at an inner side portion of said adjusting member.

10. An in-mold gate opening and closing apparatus according to claim 5, wherein the lower part of said base body is cylindrical.

11. An in-mold gate opening and closing mechanism according to claim 6 wherein the lever part of said base body is cylindrical.

12. An in-mold gate opening and closing mechanism according to claim 7 wherein the lever part of said base body is cylindrical.

13. An in-mold gate opening and closing mechanism according to claim 8 wherein the lever part of said base body is cylindrical.

14. An in-mold gate opening and closing mechanism according to claim 9 wherein the lever part of said base body is cylindrical.

\* \* \* \* \*